US011869462B2

(12) United States Patent
Pessano

(10) Patent No.: US 11,869,462 B2
(45) Date of Patent: Jan. 9, 2024

(54) TREMOLO CLAMP

(71) Applicant: Joseph Pessano, Fremont, CA (US)

(72) Inventor: Joseph Pessano, Fremont, CA (US)

( * ) Notice: Subject to any disclaimer, the term of this patent is extended or adjusted under 35 U.S.C. 154(b) by 0 days.

(21) Appl. No.: 17/887,908

(22) Filed: Aug. 15, 2022

(65) Prior Publication Data

US 2023/0047678 A1 Feb. 16, 2023

Related U.S. Application Data

(60) Provisional application No. 63/233,693, filed on Aug. 16, 2021.

(51) Int. Cl.
*G10D 3/153* (2020.01)

(52) U.S. Cl.
CPC .................................... *G10D 3/153* (2020.02)

(58) Field of Classification Search
CPC .......... G10D 3/153; G10D 3/00; G10D 1/085; G10D 3/22
See application file for complete search history.

(56) References Cited

U.S. PATENT DOCUMENTS 4,967,631 A * 11/1990 Rose ...................... G10D 3/153 84/313
5,522,299 A * 6/1996 Rose ........................ G10D 3/14 84/307

* cited by examiner

*Primary Examiner* — Kimberly R Lockett
(74) *Attorney, Agent, or Firm* — Greenblum & Bernstein, P.L.C.

(57) ABSTRACT

A tremolo clamp for attaching to a tremolo-equipped musical instrument having a tremolo arm and retaining the tremolo arm in a selected position. The tremolo clamp includes a clamp rod extending in a longitudinal direction, a fixed clamp arm fixedly attached to a first end of the clamp rod, a first positionable clamp arm slidingly attached along the clamp rod, and a second positionable clamp arm slidingly attached along the clamp rod. The first positionable clamp arm is arranged between the fixed clamp arm and the second positionable clamp arm.

20 Claims, 24 Drawing Sheets

TREMOLO CLAMP

CROSS REFERENCE TO RELATED APPLICATION

The present application claims the benefit of U.S. Provisional Application No. 63/233,693, filed Aug. 16, 2021, the contents of which are expressly incorporated herein by reference in its entirety.

BACKGROUND OF THE DISCLOSURE

1. Field of the Disclosure

The disclosure relates generally to a clamping tool, and more specifically to a tremolo clamp and a method of using a tremolo clamp for maintaining a tremolo-equipped musical instrument.

2. Background of the Disclosure

A vibrato system on a guitar is a mechanical device used to temporarily change the pitch of the strings. The vibrato system adds vibrato to the sound by changing the tension of the strings, typically at the bridge or tailpiece of an electric guitar using a controlling lever, which is alternately referred to as a whammy bar, vibrato bar, or as a tremolo arm. A guitar's "tremolo arm" can produce variations of pitch, including vibrato, it cannot produce tremolo (rapid modulation of volume). In such a manner, the term "tremolo" arm is a misnomer. It has become common practice in the art, however, for electric guitarists and manufacturers, to use the terms vibrato and tremolo interchangeably or the other way round when referring to hardware devices and the effects they produce. As noted above, other widely used names for the device include "vibrato bar" and "whammy bar," the latter attributed to guitarist Lonnie Mack's aggressive, rapid manipulation of the pitch-bending device in his 1963 song "Wham!"

The controlling lever enables the player to quickly and temporarily vary the tension of the length of the strings, which in turn changes the pitch to create a vibrato, portamento, or pitch bend effect. The pitch-bending effects have become an important part of many styles, allowing creation of sounds that could not be played without the device, such as the 1980s-era shred guitar "dive bomb" effect. Since the regular appearance of mechanical vibrato systems in the 1950s, many guitarists have used them—from Chet Atkins to Duane Eddy and the surf music of The Ventures, The Shadows, and Dick Dale. In the 1960s and 1970s, Jimi Hendrix, Jeff Beck, David Gilmour, Ritchie Blackmore, Jimmy Page, and Frank Zappa used vibrato arms for more pronounced effects. In the 1980s, shred guitarists Eddie Van Halen, Eric Johnson, Joe Satriani and Steve Vai, and metal guitarists Kerry King, Ritchie Blackmore, Kirk Hammett, Terje Rypdal, David Torn and David Duhig used vibrato in a range of metal-influenced styles, many aided by the development of the double-locking design pioneered by Floyd Rose or the later Kahler, which eliminated many of the tuning issues associated with more basic designs and allowed guitarists to employ dramatic "dive bomb" effects freely throughout a performance.

Around 1979, Floyd D. Rose invented the locking tremolo. This vibrato system became highly popular among 1980s heavy metal guitarists due to its tuning stability and wide range of pitch variation. The original Floyd Rose system was similar to the Fender synchronized tremolo, but with a number of extra mechanisms. The first is a locking plate on the head nut, tightened with a hex key that fixes the strings at this point after tuning. This provides extra tuning stability, particularly while using the vibrato arm—but it also prevents tuning with the machine heads when the nut is locked. Additional stability was provided by a second lock on the bridge nut, making a double locking tremolo system that was more complex to set up. Many guitars equipped with locking tremolo systems have a cavity routed in the body beneath and behind the bridge, extending the range of motion, a concept first popularized by Steve Vai.

While a vibrato-equipped guitar provides many benefits to guitars, the floating tremolos of vibrato-equipped guitars are highly temperamental. A floating tremolo is temperamental, for example, because the floating tremolo is reliant on the tension between the strings and springs to be perfectly balanced. If the balance is disturbed (e.g., through improper string tension), the whole system won't work as intended. A tremolo system is designed to have tuning stability while performing note acrobatics. As discussed above acrobatics include; dropping the pitch of a note, raising the pitch of a note, creating a flutter of a note, and other tricks that require tremendous skill.

As vibrato-equipped guitars are highly temperamental it is typically more difficult to re-string and tune than a fixed-tailpiece guitar. Changing the strings on floating tremolo is a serious undertaking and can be time-consuming. For example, with a floating tremolo bridge, when one string is detached in order to replace it, the total string tension pulling in one direction on the floating bridge is decreased (while the springs pulling the floating bridge providing the counter tension in the other direction remain the same), causing the floating bridge to pull downwards (e.g., into the guitar body). This movement of the floating bridge increases the tension on the remaining strings, which can cause the strings to break. Additionally, when in such "un-balanced" position, the locks on the bridge and tuning heads may be inaccessible.

In order to prevent the floating bridge from moving into a recessed position when one or more strings are detached, it is known to wedge an object between the guitar body and under the back of the floating bridge so as to prop up the floating bridge. For example, placing popsicle sticks or a battery or a towel under the back of the tremolo may work for some tremolos and some people, however, such approaches do not work for all tremolos. Additionally, with such approaches the placement of the object may cause damage to the guitar body. Furthermore, for some users, when placing an object under the bridge, there is too much clutter present to easily and efficiently performing the string changing and tuning. Also, with these techniques as user may not able to utilize their fingers to make fine tune adjustments, because there are obstacles in the way. As such, using an object to brace the tremolo from behind and underneath the floating bridge has drawbacks, and these techniques provide lackluster results. Also, if the support dislodges during the guitar maintenance, the entire Tremolo system would need to be reset. For a beginner, this process of resetting the tremolo may require up to an hour of additional time.

Due to the difficulty in re-stringing and tuning a vibrato-equipped guitar (for example, as compared to a fixed-tailpiece guitar) and the drawbacks of known approaches, the task of changing strings on a vibrato-equipped guitar may easily be put off, which can detrimentally affect the tone of the guitar, and may impact a player's derived enjoyment therefrom. And If debris of sweat and skin stays on the fretboard for an extended period of time, due from negligent care, it can sometimes require a luthier with the knowledge on how to re-fret a guitar fretboard to re-fret the guitar fretboard. As such, there is a need in the art for an improved approach—a better, easier way to change strings, so as to maintain a tremolo-equipped instrument.

SUMMARY OF EMBODIMENTS OF THE DISCLOSURE

Embodiments of the disclosure are directed to a tremolo clamp for attaching to a tremolo-equipped musical instrument having a tremolo arm and retaining the tremolo arm in a selected position. The tremolo clamp includes a clamp rod extending in a longitudinal direction, a fixed clamp arm fixedly attached to a first end of the clamp rod, a first positionable clamp arm slidingly attached along the clamp rod, and a second positionable clamp arm slidingly attached along the clamp rod. The first positionable clamp arm is arranged between the fixed clamp arm and the second positionable clamp arm.

In embodiments, the fixed clamp arm and the first positionable clamp arm are operable to attach the tremolo clamp to the tremolo-equipped guitar and the second positionable clamp arm is operable to retain the tremolo arm in the selected position.

In additional embodiments, each of the first positionable clamp and the second positionable clamp includes a frictional locking mechanism operable to releasably lock the first positionable clamp or the second positionable clamp in relative position along longitudinal direction on the clamp rod.

In further embodiments, the frictional locking mechanism includes a spring and lock lever, the lock lever having a hole therethrough configured to receive the clamp rod.

In some embodiments, the frictional locking mechanism is a one-way locking mechanism that permits movement in a first direction along the longitudinal direction while preventing movement in a second direction opposite the first direction.

In embodiments, the frictional locking mechanism for the first positionable clamp is a one-way locking mechanism that permits movement in a first direction along the longitudinal direction while preventing movement in a second direction opposite the first direction and the frictional locking mechanism for the second positionable clamp is a two-way locking mechanism that prevents movement in either direction along the longitudinal direction.

In additional embodiments, each of the clamp arms includes a removable contact pad configured for engagement with a body of the musical instrument and/or the tremolo arm.

In further embodiments, the contact pad has a concave contact surface and a groove traversing the concave contact surface.

In embodiments, a fixed clamp arm contact pad faces a first direction and a first positionable clamp arm contact pad and the second positionable clamp arm contact pad face a second direction opposite to the first direction.

In embodiments, each of the clamp arms includes a pad platform upon which the contact pad is removably attached, and wherein the contact pad is selectively rotatable on the pad platform.

In some embodiments, the second positionable clamp arm includes an additional contact pad on a side of the clamp arm opposite the contact pad.

In further embodiments, the second positionable clamp arm includes a tremolo arm support on a side of the clamp arm opposite the contact pad.

In some embodiments, tremolo clamp further comprises an end cap frictionally engaged with a second end of the clamp rod.

In embodiments, each of the clamp arms includes a rod passage for accommodating the clamp rod.

Additional embodiments of the disclosure are directed to a method using a tremolo clamp to retain a tremolo arm of a tremolo-equipped musical instrument in a selected position, the tremolo clamp having a clamp rod extending in a longitudinal direction; a fixed clamp arm fixedly attached to a first end of the clamp rod; a first positionable clamp arm slidingly attached along the clamp rod; and a second positionable clamp arm slidingly attached along the clamp rod, the method comprising: attaching the tremolo clamp to a selected region of the tremolo-equipped musical instrument by sliding the first positionable clamp arm along the clamp rod and clamping the musical instrument between the fixed clamp arm and the first positionable clamp arm; placing the tremolo arm in the selected position; and sliding the second positionable clamp along the clamp rod into contact with the tremolo arm to retain the tremolo arm in the selected position.

In embodiments, the selected position of the tremolo arm releases tension on strings of the musical instrument.

In additional embodiments, the selected position of the tremolo arm releases tension on springs of the tremolo-equipped musical instrument.

In further embodiments, the selected region is behind or in front of a bridge of the musical instrument.

In some embodiments, the selected position is a raised position relative to the musical instrument.

In some embodiments, the selected position is a lowered position relative to the musical instrument.

The above and other aspects and advantages of the disclosure will become more readily apparent from the following description and figures, illustrating by way of example the principles of the general inventive concepts.

BRIEF DESCRIPTION OF THE DRAWINGS

These and other features of the general inventive concepts will become better understood with regard to the following description and accompanying drawings in which.

DETAILED DESCRIPTION OF THE EMBODIMENTS OF THE DISCLOSURE

Figure 1:
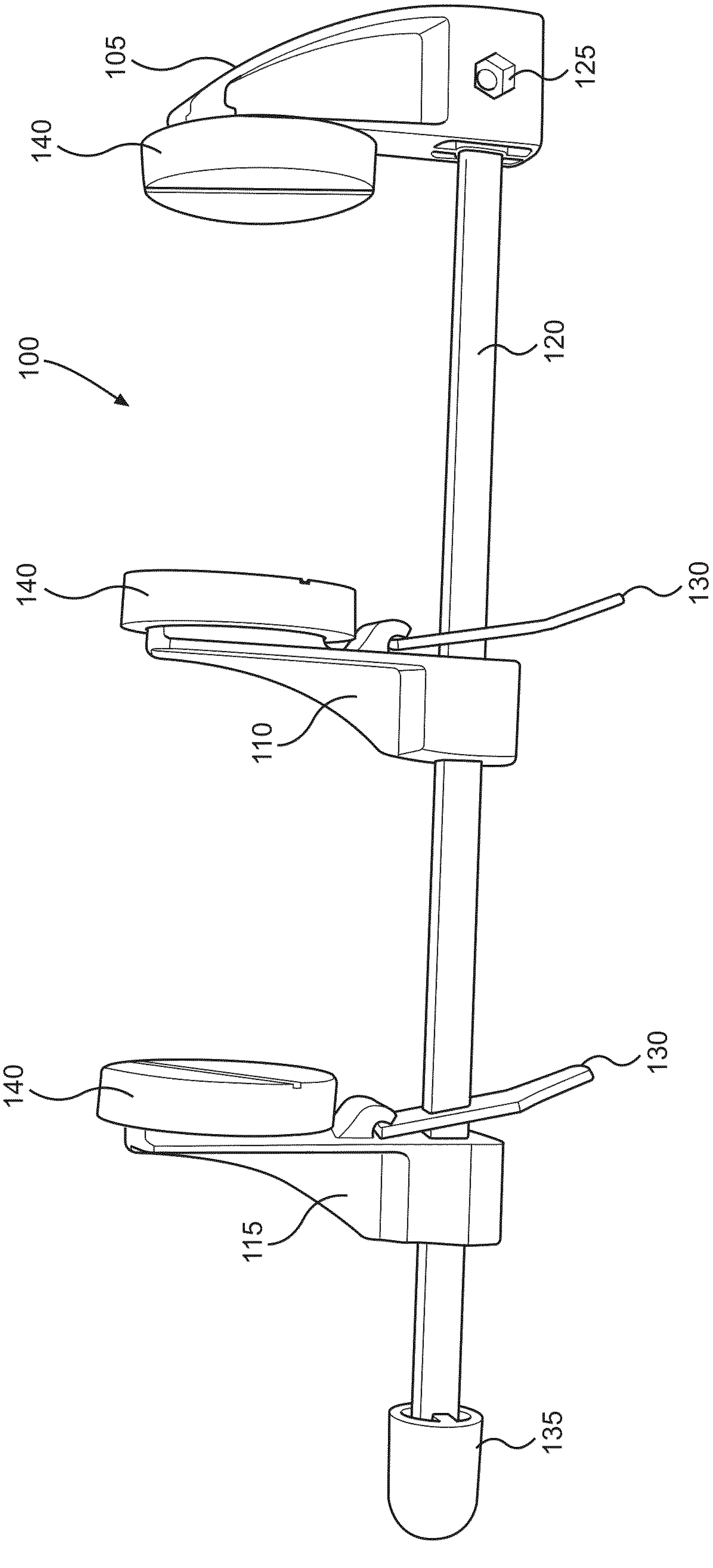
FIG. 1 shows an exemplary and non-limiting perspective view of a tremolo clamp in accordance with aspects of the disclosure.

This detailed description merely describes exemplary embodiments of the disclosure and is not intended to limit the scope of the disclosure in any way. Indeed, the contemplated disclosure is broader than the exemplary embodiments. The terms used in any claims have their full ordinary meaning unless an express definition is provided herein.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As used herein, the singular forms "a," "an," and "the" include the plural reference unless the context clearly dictates otherwise. For example, reference to "a magnetic material" would also indicate that mixtures of one or more magnetic materials can be present unless specifically excluded. As used herein, the indefinite article "a" indicates one as well as more than one and does not necessarily limit its referent noun to the singular.

Except where otherwise indicated, all numbers expressing quantities used in the specification and claims are to be understood as being modified in all examples by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

The present disclosure is directed to an improved approach—a better, easier way to change strings, so as to maintain a tremolo-equipped instrument. The present disclosure provides a highly viable and adjustable tool that enables a user to work on many different guitars (e.g., with different body sizes and shapes, and/or with different tremolo systems) with ease and confidence. By implementing aspects of the present disclosure, the tremolo clamp is operable to hold down the tremolo arm for the duration of the string change while providing the user clutter-free access to the guitar. Implementing aspects of the disclosure can solve at least five maintenance issues/problems that arise when working on a guitar that has a floating tremolo or a non-floating tremolo: (1) string changes; (2) height adjustments of the tremolo; (3) intonation adjustments; (4) truss rod adjustments; and (5) spring changes.

FIG. 1 shows an exemplary and non-limiting perspective view of a tremolo clamp 100 in accordance with aspects of the disclosure. As shown in FIG. 1, the exemplary tremolo clamp 100 includes a fixed clamp arm 105, a first positionable clamp arm 110, and a second positionable clamp arm 115, with each of the clamp arms arranged on a clamp rod 120. The fixed clamp arm 105 is fixed to a first end of the clamp rod 120 with a fastener 125. The first positionable clamp arm 110 and the second positionable clamp arm 115 clamp arm 115 are each positionally-adjustable on the clamp rod 120. In some embodiments, the first positionable clamp arm 110 and the second clamp arm 115 may each be configured the same. In other contemplated embodiments, the first positionable clamp arm and the second clamp arm may be configured differently from each other. Attached to the second end of the clamp rod 120 is an end cap 135, which functions to prevent inadvertent removal of the positionable clamp arms (e.g., the second positionable clamp arm 115) from the clamp rod. The end cap 135 (or stabilizer cap) may also be used as a surface contact support pad when the tremolo clamp 100 is used to support the guitar in a propped position. In embodiments, the end cap 135 (or stabilizer cap) may be a rubber cap, with other suitable materials (e.g., plastics) contemplated by the disclosure.

In accordance with aspects of the disclosure, the fixed clamp arm 105 and the first positionable clamp arm 110 are used for clamping to a guitar body. The second positionable clamp arm 115 is used for selectively positioning the tremolo arm (e.g., in a raised or lowered position relative to the guitar body). The clamp rod 120 provides stabilization and strength to the tremolo clamp 100, and in embodiments, the clamp rod 120 may be a metal bar. The first positionable clamp arm 110 and the second positionable clamp arm 115 are slidable along the clamp rod 120. With this exemplary embodiment, the first positionable clamp arm 110 and the second positionable clamp arm 115 are one-way locking. That is, each of the first positionable clamp arm 110 and the second positionable clamp arm 115 are configured to slide freely when pushed in a clamping direction (e.g., rightward in FIG. 1) but remain fixed in relative position on the clamp rod 120 when pushed in a releasing direction (e.g., leftward in FIG. 1). In such a manner, when the tremolo clamp 100 is being attached to a guitar body, a user can hand-squeeze to move the first positionable clamp arm 110 closer to the fixed clamp arm 105 to pinch the guitar body therebetween. Once the tremolo clamp 100 is attached to the guitar body, the first positionable clamp arm 110 (without being unlocked) cannot move in a releasing direction. In such a manner, once attached to the guitar body, the tremolo clamp 100 is prevented from premature or unwanted detachment.

As shown in FIG. 1, each of the first positionable clamp arm 110 and the second positionable clamp arm 115 have a respective locking mechanism including a locking arm 130 and a spring (not shown). By pushing a locking arm 130 toward its respective positionable clamp arm, a frictional engagement between the locking arm 130 and the clamp rod 120 is reduced so as unlock the one-way locking of the positionable clamp arm. In such a manner, each of the first positionable clamp arm 110 and the second positionable clamp arm 115 may be selectively unlockable to slide along the clamp rod 120 so as to be positionally-adjustable on the clamp rod 120, for example, to enable adjustment or positioning of the positionable clamp arms (e.g., in an "open" position to enable placement on a guitar body).

As shown in FIG. 1, the fixed clamp arm 105, the first positionable clamp arm 110, and the second positionable clamp arm 115 each have a contact pad 140 attached thereto. In accordance with aspects of the disclosure, the respective contact pads 140 contact the upper and lower sides of the guitar body, and the tremolo arm. The contact pads may each be made of a medium density rubber pad for gripping the body of the guitar, as well as holding the tremolo arm in place. In accordance with aspects of the disclosure, structural elements of the tremolo clamp 100 (e.g., clamp arms, contact pads, locking arms, clamp rod) are designed with the ability to have replacement/upgraded parts, with new versions of original parts and/or upgraded parts. Thus, for example, in embodiments, the contact pads 140 are removably attachable to the respective clamp arms.

Figure 2:
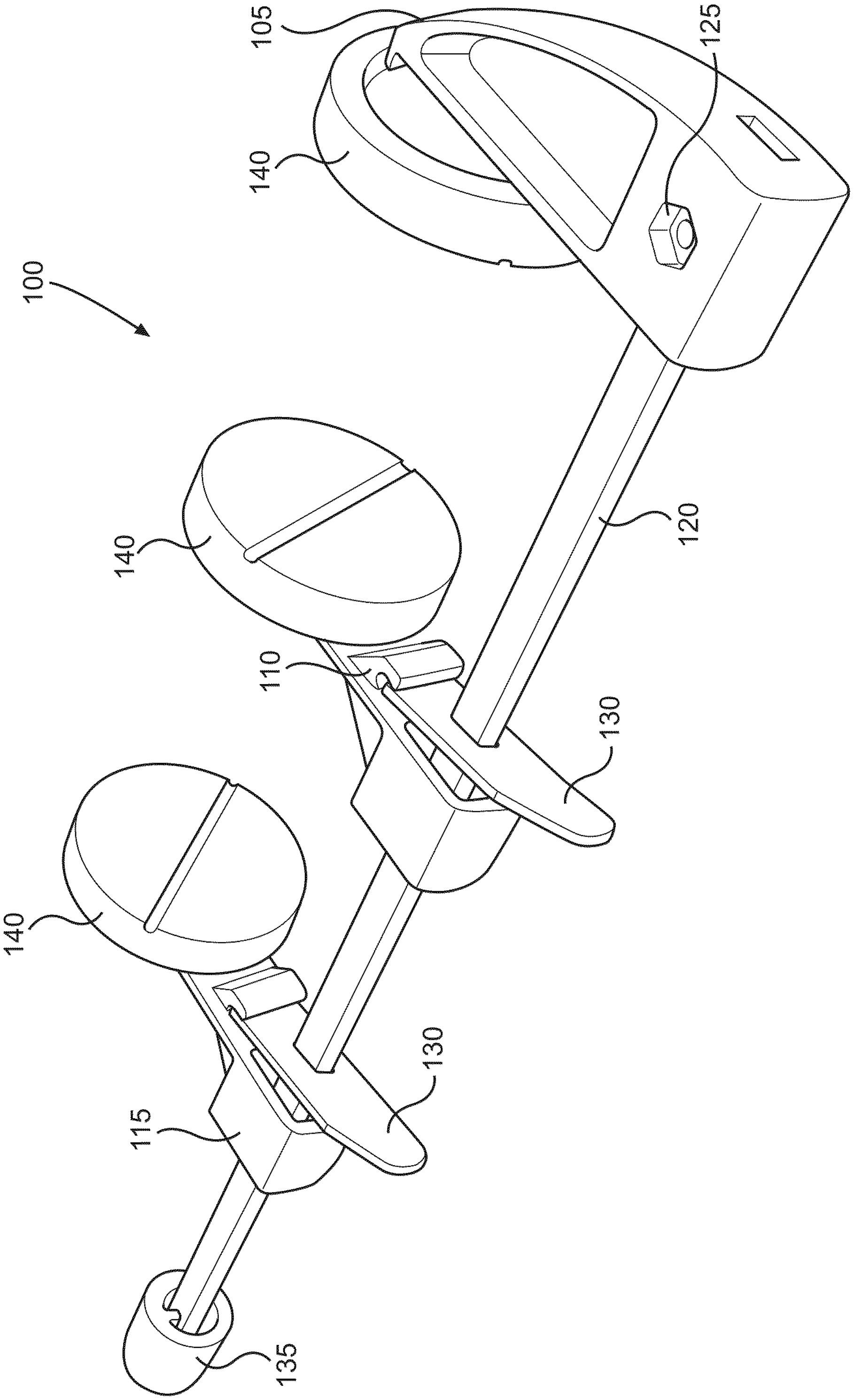
FIG. 2 shows another perspective view of the exemplary and non-limiting tremolo clamp in accordance with aspects of the disclosure.

FIG. 2 shows another perspective view of the exemplary and non-limiting tremolo clamp 100 in accordance with aspects of the disclosure. As shown in FIG. 2, the exemplary tremolo clamp 100 includes a fixed clamp arm 105, a first positionable clamp arm 110, and a second positionable clamp arm 115, with each of the clamp arms arranged on a clamp rod 120. The fixed clamp arm 105 is fixed to a first end of the clamp rod 120 with a fastener 125. The first positionable clamp arm 110 and the second positionable clamp arm 115 clamp arm 115 are each positionally-adjustable on the clamp rod 120. Attached to the second end of the clamp rod 120 is an end cap 135. Each of the first positionable clamp arm 110 and the second positionable clamp arm 115 have a respective locking mechanism including a locking arm 130 and a spring (not shown). Additionally, as shown in FIG. 2, the fixed clamp arm 105, the first positionable clamp arm 110, and the second positionable clamp arm 115 each have a contact pad 140 attached thereto.

Figure 3:
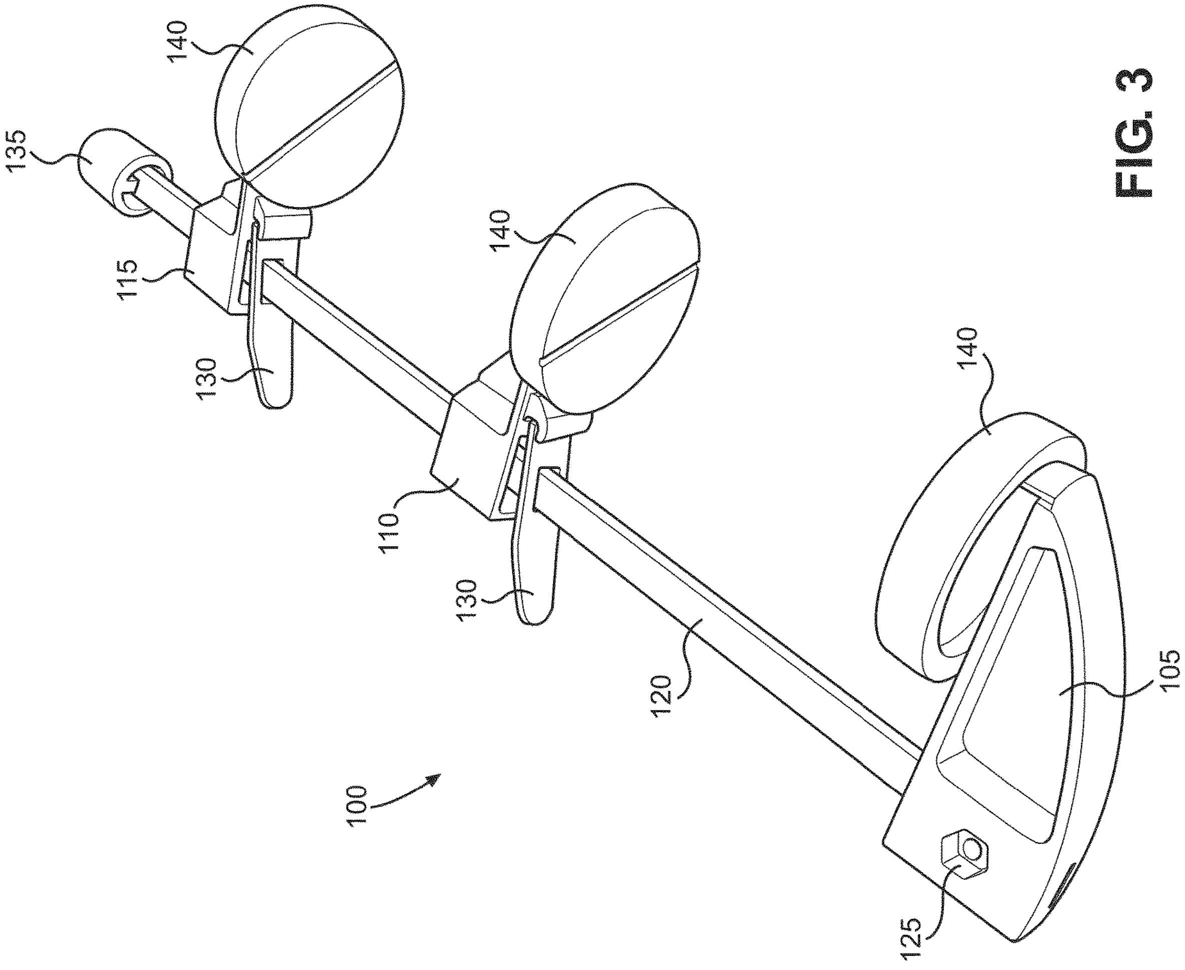
FIG. 3 shows another perspective view of the exemplary and non-limiting tremolo clamp in accordance with aspects of the disclosure.

FIG. 3 shows another perspective view of the exemplary and non-limiting tremolo clamp 100 in accordance with aspects of the disclosure. As shown in FIG. 2, the exemplary tremolo clamp 100 includes a fixed clamp arm 105, a first positionable clamp arm 110, and a second positionable clamp arm 115, with each of the clamp arms arranged on a clamp rod 120. The fixed clamp arm 105 is fixed to a first end of the clamp rod 120 with a fastener 125. The first positionable clamp arm 110 and the second positionable clamp arm 115 clamp arm 115 are each positionally-adjustable on the clamp rod 120. Attached to the second end of the clamp rod 120 is an end cap 135. Each of the first positionable clamp arm 110 and the second positionable clamp arm 115 have a respective locking mechanism including a locking arm 130 and a spring (not shown). Additionally, as shown in FIG. 2, the fixed clamp arm 105, the first positionable clamp arm 110, and the second positionable clamp arm 115 each have a contact pad 140 attached thereto.

Figure 4:
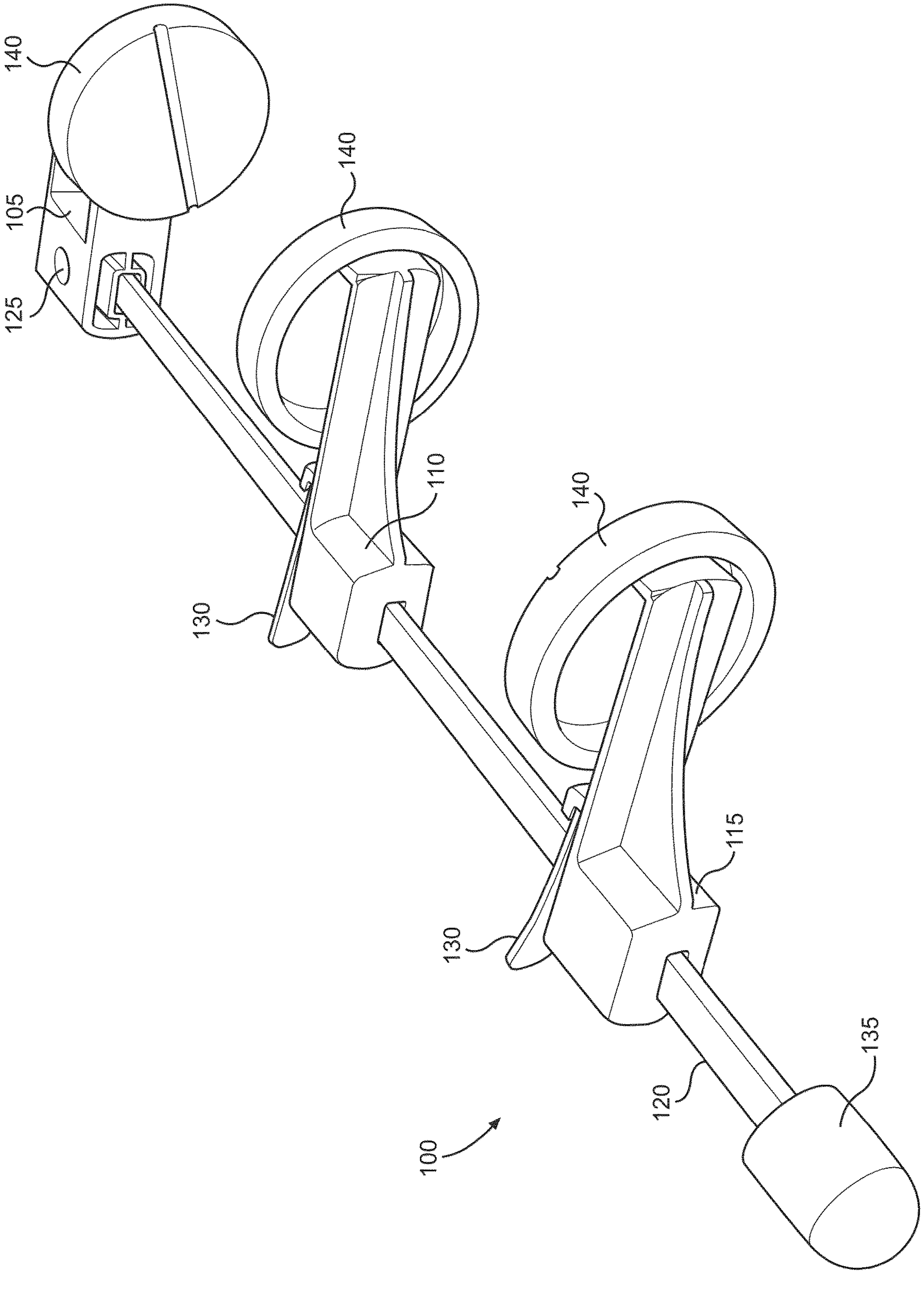
FIG. 4 shows yet another perspective view of the exemplary and non-limiting tremolo clamp in accordance with aspects of the disclosure.

FIG. 4 shows yet another perspective view of the exemplary and non-limiting tremolo clamp 100 in accordance with aspects of the disclosure. As shown in FIG. 4, the exemplary tremolo clamp 100 includes a fixed clamp arm 105, a first positionable clamp arm 110, and a second positionable clamp arm 115, with each of the clamp arms arranged on a clamp rod 120. The fixed clamp arm 105 is fixed to a first end of the clamp rod 120 with a fastener 125. The first positionable clamp arm 110 and the second positionable clamp arm 115 clamp arm 115 are each positionally-adjustable on the clamp rod 120. Attached to the second end of the clamp rod 120 is an end cap 135. Each of the first positionable clamp arm 110 and the second positionable clamp arm 115 have a respective locking mechanism including a locking lever 130 and a spring (not shown). Additionally, as shown in FIG. 2, the fixed clamp arm 105, the first positionable clamp arm 110, and the second positionable clamp arm 115 each have a contact pad 140 attached thereto.

Figure 5A:
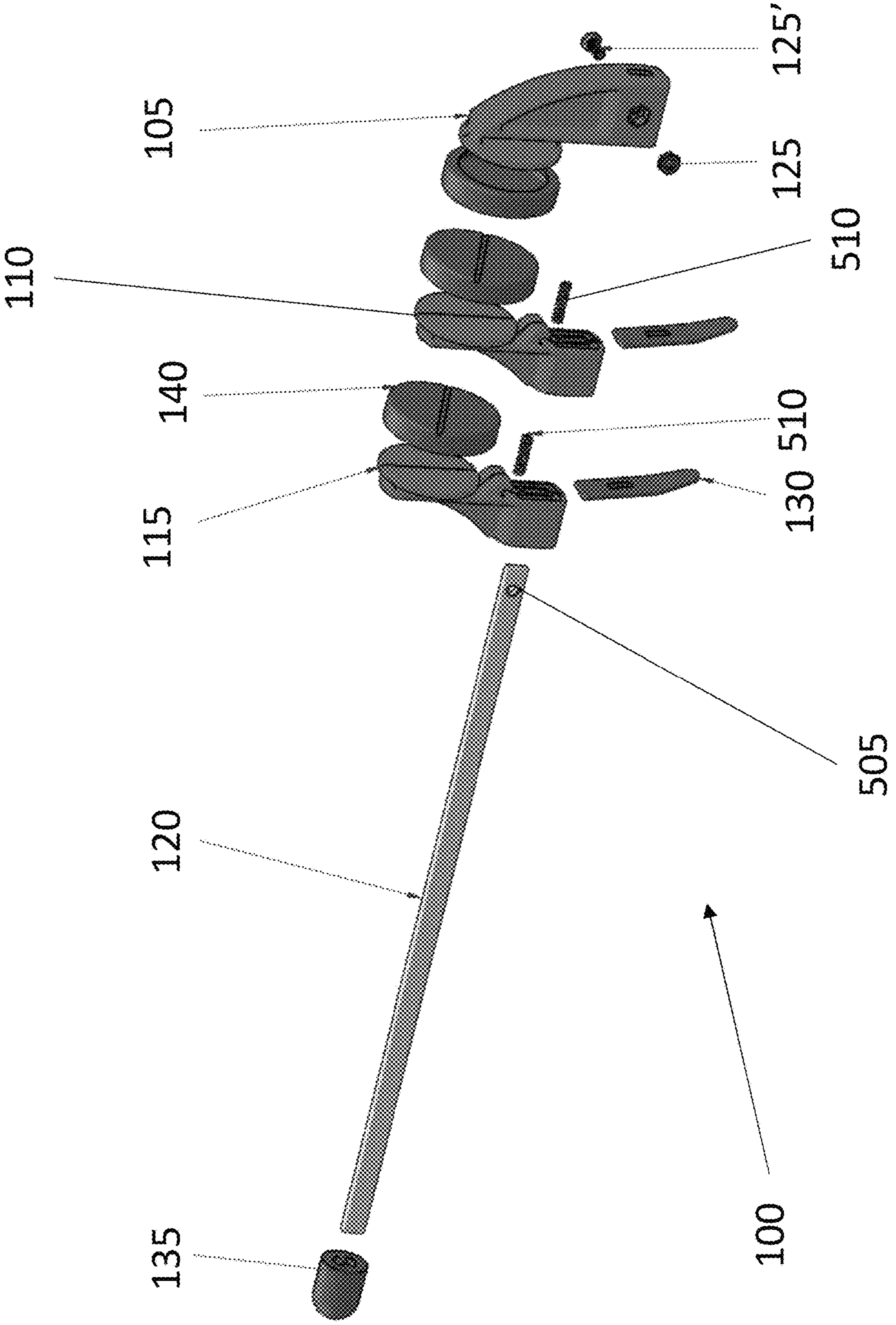
FIG. 5A shows an exploded view of the exemplary and non-limiting tremolo clamp in accordance with aspects of the disclosure.

FIG. 5A shows an exploded view of the exemplary and non-limiting tremolo clamp 100 in accordance with aspects of the disclosure. As shown in FIG. 5A, the exemplary tremolo clamp 100 includes a fixed clamp arm 105, a first positionable clamp arm 110, and a second positionable clamp arm 115, with each of the clamp arms arrangeable on a clamp rod 120. With an exemplary embodiment, the first positionable clamp arm 110 (for clamping an front side of the guitar) and/or the second positionable clamp arm 115 (for positioning the tremolo arm) may not be as robust as the fixed clamp arm 105 (for clamping an back side of the guitar).

The fixed clamp arm 105 is fixed via a hole 505 to a first end of the clamp rod 120 with a fastener 125 and 125' (e.g., a bolt and nut). Each of the first positionable clamp arm 110 and the second positionable clamp arm 115 have a respective locking mechanism including a locking lever 130 and a spring 510. The respective metal lever and spring lock the first positionable clamp arm 110 and the second positionable clamp arm 115 into position along the longitudinal axis of the clamp rod 120. An end cap 135 is attachable to the second end of the clamp rod 120.

Additionally, as shown in FIG. 5A, the fixed clamp arm 105, the first positionable clamp arm 110, and the second positionable clamp arm 115 each have a contact pad 140 attachable thereto. In accordance with aspects of the disclosure, the contact pad 140 helps grip the body of the guitar so that the tremolo clamp 100 stays locked into position during guitar maintenance. The contact pad 140 is removable from the fixed clamp arm 105 or the fixed clamp arm 110, for example, when a user needs to replace a worn-down pad or would like to replace the pad with a pad that has a different shape (e.g., a different contact shape) or a different contact material (e.g., cork, plastic, felt).

Figure 5B:
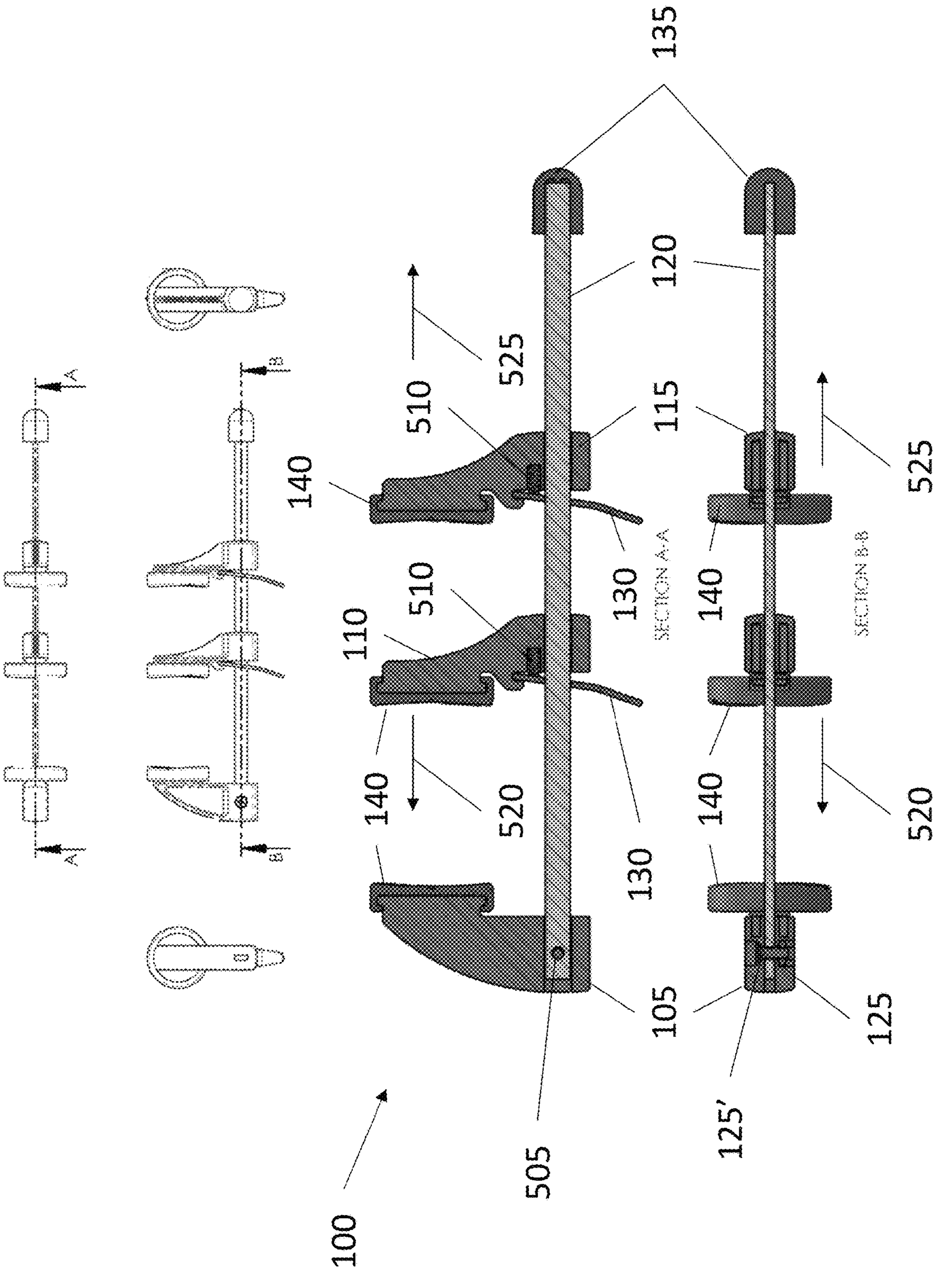
FIG. 5B shows side and section views of the exemplary and non-limiting tremolo clamp in accordance with aspects of the disclosure.

FIG. 5B shows side and section views of the exemplary and non-limiting tremolo clamp 100 in accordance with aspects of the disclosure. As shown in FIG. 5B, the exemplary tremolo clamp 100 includes a fixed clamp arm 105, a first positionable clamp arm 110, and a second positionable clamp arm 115, with each of the clamp arms arranged on a clamp rod 120. The fixed clamp arm 105 is fixed via a hole 505 to a first end of the clamp rod 120 with a fastener 125 and 125' (e.g., a bolt and nut). Each of the first positionable clamp arm 110 and the second positionable clamp arm 115 have a respective locking mechanism including a locking lever 130 and a spring 510. An end cap 135 is attached to the second end of the clamp rod 120. Additionally, as shown in FIG. 5B, the fixed clamp arm 105, the first positionable clamp arm 110, and the second positionable clamp arm 115 each have a contact pad 140 attached thereto. In accordance with aspects of the disclosure, the contact pad 140 helps grip the body of the guitar so that the tremolo clamp 100 stays locked into position during guitar maintenance.

With an exemplary and non-limiting embodiment, the tremolo clamp 100 may have an overall length of 213.32 mm, an overall height of 70.39 mm and an overall width of 37.7 mm (at the contact pad diameter). As shown in FIG. 5B, the spring 510 is operable to push the locking lever 130 leftwards (in FIG. 5B) into frictional engagement with the clamp rod 120. By depressing the locking lever (i.e., moving the locking lever rightwards in FIG. 5B), the locking engagement of the locking lever 130 with the clamp rod 120 is temporarily suspended, thus allowing the respective positionable clamp arm to be slid along the clamp rod 120 in the opening direction 525. As noted above, with this exemplary embodiment, the positionable clamp arm is operable to lock in the opening direction 525, while being freely positionable in the closing direction 520.

Figure 6:
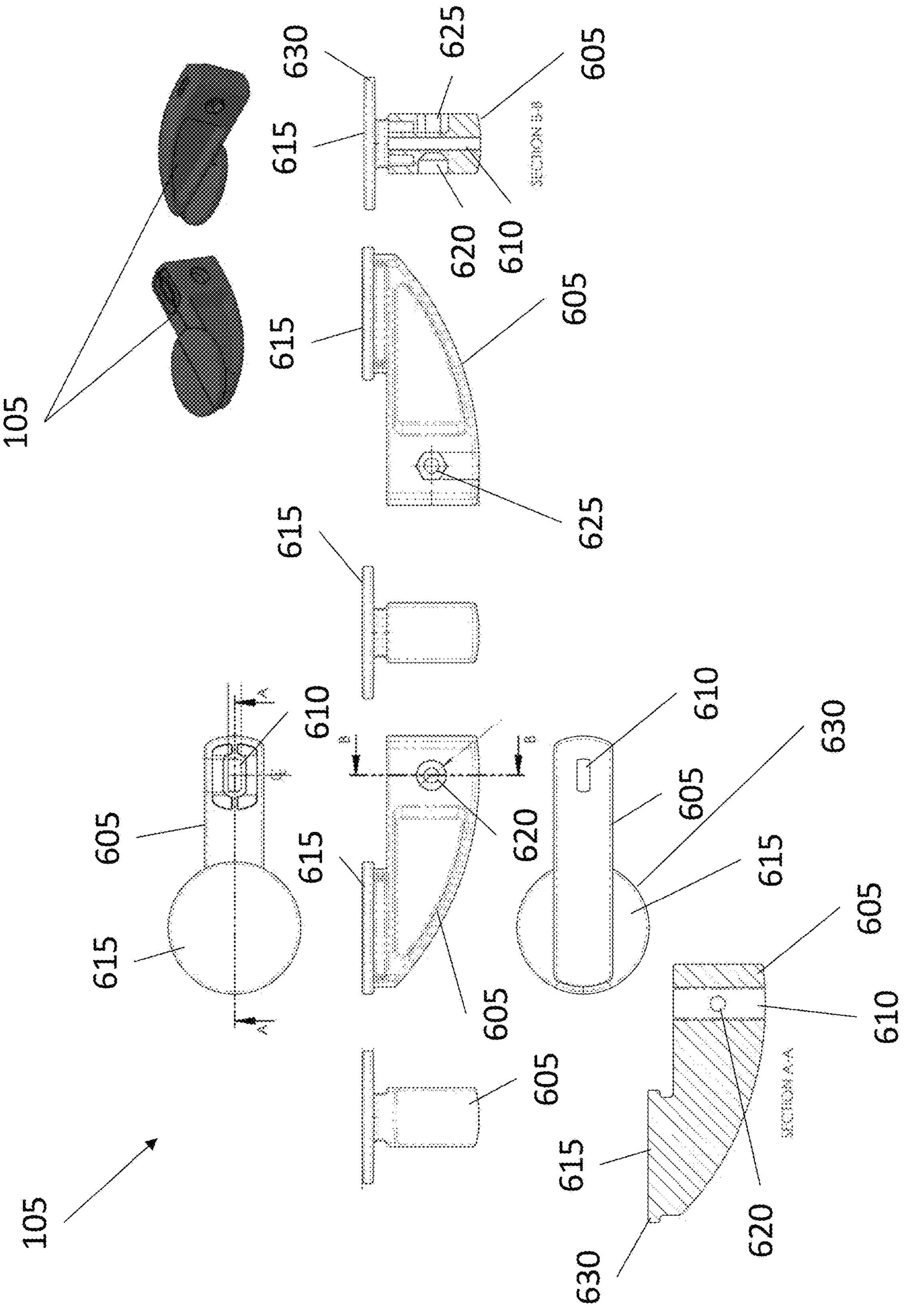
FIG. 6 shows various views of an exemplary and non-limiting fixed clamp arm of the tremolo clamp in accordance with aspects of the disclosure.

FIG. 6 shows various views of an exemplary and non-limiting fixed clamp arm 105 of the tremolo clamp in accordance with aspects of the disclosure. As shown in FIG. 6, the fixed clamp arm 105 includes a body 605 and a pad platform 615 having a circular shape in plan view. The pad platform 615 includes a rim 630 configured to retain a contact pad (not shown) thereon. The body 605 includes a rod passage 610 for accommodating the clamp rod (not shown). As shown in FIG. 6, the rod passage 610 may have a rectangular cross-sectional shape. In accordance with aspects of the disclosure, the rectangular cross-sectional shape of the rod passage 610 prevents any rotation of the fixed clamp arm 105 around the longitudinal axis of the clamp rod when attached thereto. The body 605 includes a through-hole (with corresponding fastener accommodation areas 620 and 625) that intersects with the rod passage 610. The clamp rod (not shown) is inserted into the body 605 and fastened to the fixed clamp arm 105 with a fastener (e.g., a bolt and nut) arranged in the corresponding fastener accommodation areas 620 and 625 of the body 605.

With an exemplary and non-limiting embodiment, the fixed clamp arm 105 may have a height of 24.98 mm and the pad platform 615 may have a diameter of 28.24 mm. The rim 630 of the pad platform 615 may have a thickness of 2.54 mm. As shown in FIG. 6, with an exemplary and non-limiting embodiment, the rod passage 610 may have a rectangular cross-sectional shape with a length of 7.01 mm and a width of 2.75 mm.

With an exemplary and non-limiting embodiment, the fixed clamp arm 105 may be injection molded with plastic fibers. These plastic fibers provide the fixed clamp arm 105 of the tremolo clamp greater rigidity as well as overall strength. With an exemplary and non-limiting embodiment, the fixed clamp arm 105 may be the most robust of the three arms. As explained above, the fixed clamp arm 105 is affixed to the clamp rod 120 using, for example, a bolt and nut. As the fixed clamp arm 105 is attached with a nut and bolt, the fixed clamp arm 105 is immovable in the longitudinal direction of the clamp rod. As not all guitar bodies are flat, however, in accordance with aspects of the disclosure, in embodiments, the fixed clamp arm 105 is operable to have the ability to shift slightly so the fixed clamp arm 105 can be attached to guitar bodies that, for example, have a curve to the guitar body shape (e.g., an archtop guitar).

Figure 7:
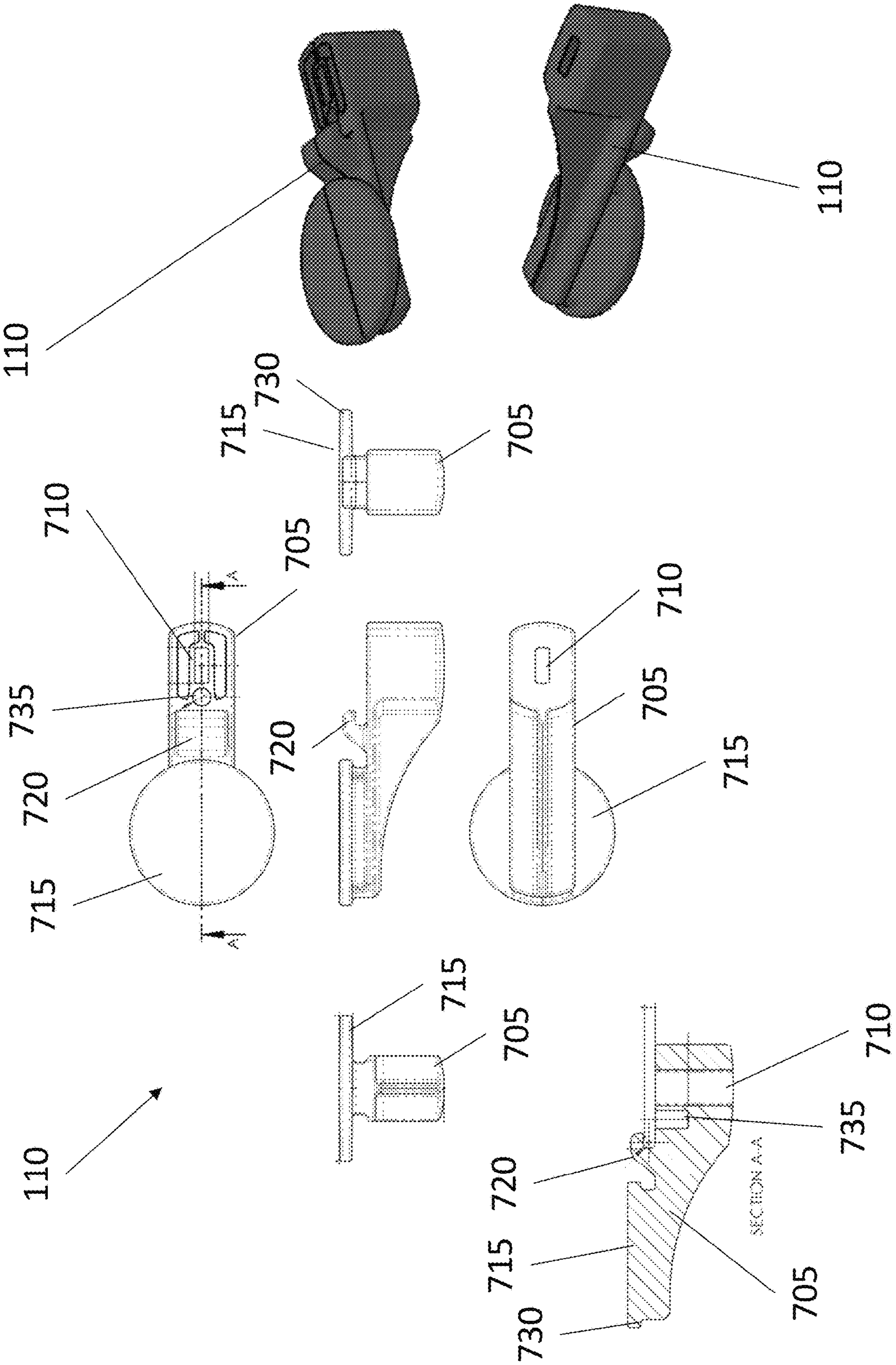
FIG. 7 shows various views of an exemplary and non-limiting positionable clamp arm of the tremolo clamp in accordance with aspects of the disclosure.

FIG. 7 shows various views of an exemplary and non-limiting positionable clamp arm 110 of the tremolo clamp in accordance with aspects of the disclosure. As shown in FIG. 7, the positionable clamp arm 110 includes a body 705 and a pad platform 715 having a circular shape in plan view. The pad platform 715 includes a rim 730 configured to retain a contact pad (not shown) thereon. The body 705 includes a rod passage 710 for accommodating the clamp rod (not shown). As shown in FIG. 7, the rod passage 710 may have a rectangular cross-sectional shape. In accordance with aspects of the disclosure, the rectangular cross-sectional shape of the rod passage 710 prevents any rotation of the positionable clamp arm 110 around the longitudinal axis of the clamp rod when attached thereto. The clamp rod (not shown) is inserted into the body 705 and the body 705 is locked to the clamp rod with a locking mechanism, including a locking lever (not shown) and a spring (not shown).

As shown in FIG. 7, the body 705 includes a lever retainer 720 configured to retain a locking lever (not shown) and a spring accommodation space 735 configured to accommodate a spring (not shown). The spring accommodation space 735 is arranged adjacent the lever retainer 720. In operation, a spring (not shown) is arranged spring accommodation space 735 and biases the locking lever (not shown) upwardly into a locking position (relative to the clamp rod, not shown).

With an exemplary and non-limiting embodiment, the positionable clamp arm 110 may have a height of 20.35 mm and the pad platform 615 may have a diameter of 28.24 mm the rim 730 of the pad platform 615 may have a thickness of 2.54 mm. With an exemplary and non-limiting embodiment, the rod passage 710 may have a rectangular cross-sectional shape with a length of 7.01 mm and a width of 2.75 mm. The lever retainer 720 may have a spring accommodation space 735 with an inner diameter of 2.41 mm and an opening width of 2.13 mm (e.g., slightly smaller, so as to retain a locking lever via frictional engagement). The spring accommodation space 735 may have a diameter of 3.6 mm and a depth of 6.34 mm. The center of the spring accommodation space 735 may be spaced 5.66 mm from an end of the spring accommodation space and may be spaced 6.15 mm from a center of the rod passage 710.

With an exemplary and non-limiting embodiment, the positionable clamp arm 110 may be injection molded with plastic fibers. These plastic fibers provide the positionable clamp arm 110 of the tremolo clamp greater rigidity as well as overall strength.

Figure 8:
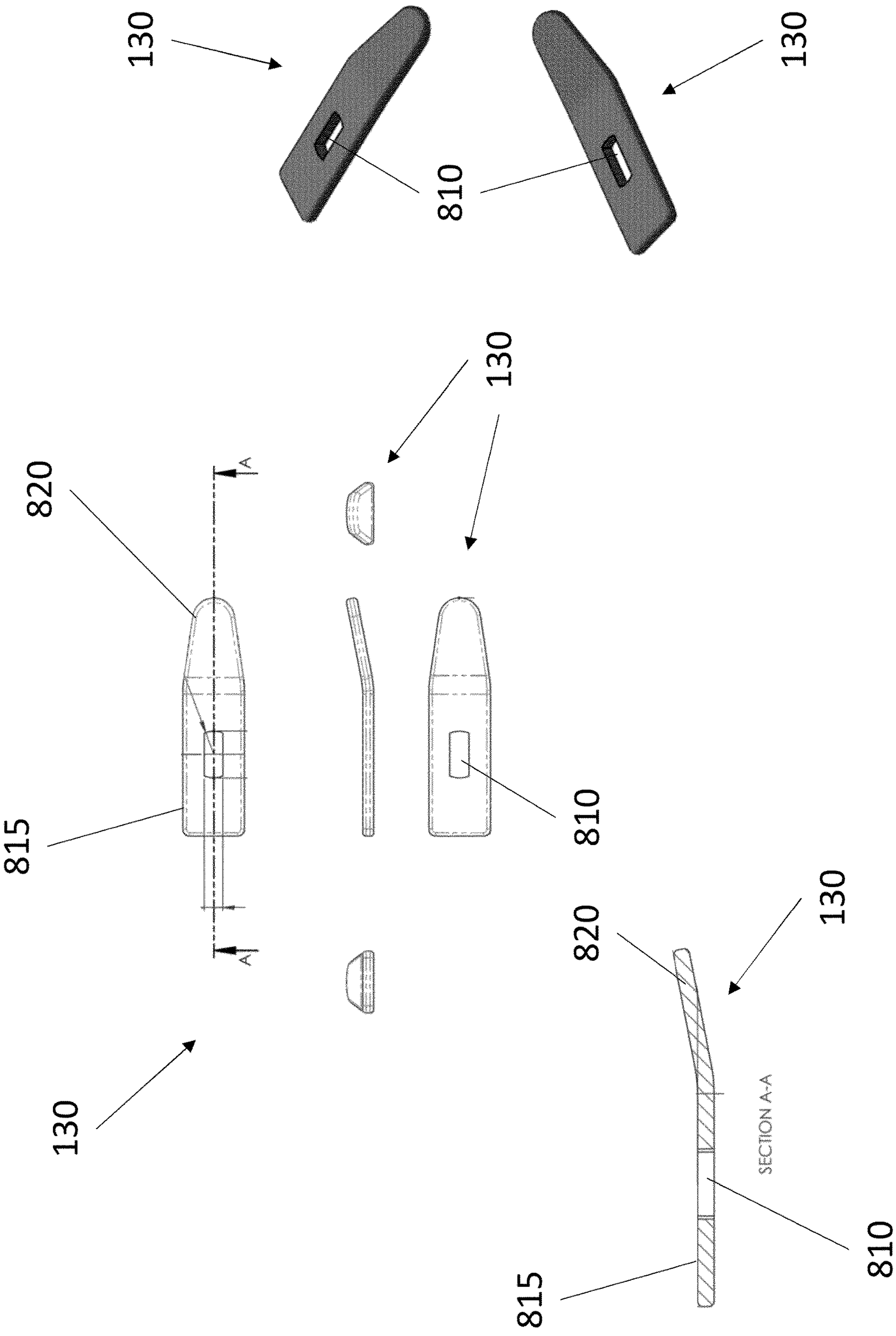
FIG. 8 shows various views of an exemplary and non-limiting locking lever of the tremolo clamp in accordance with aspects of the disclosure.

FIG. 8 shows various views of an exemplary and non-limiting locking lever 130 of the tremolo clamp in accordance with aspects of the disclosure. As shown in FIG. 8, the locking lever 130 is formed of a planar element having a first portion 815 and a second portion 820 that projects at an angle relative to the first portion 815. The locking lever includes a hole 810 in a center region of the first portion 815. The hole 810 is configured for receiving the clamp rod 120. As shown in FIG. 8, the first portion 815 may have a rectangular shape in plan view, whereas the second portion 820 may have a tapering shape.

With an exemplary and non-limiting embodiment, the locking lever 130 may have an overall length (in plan view) of 34.2 mm and a width of 8.89 mm, and a thickness of 2.76 mm. The first portion 815 may have a length of 20.37 mm and the second portion 820 may project at an angle of 11° relative to the first portion 815, with a radius of curvature of 12.7 mm. With an exemplary and non-limiting embodiment, the hole 810 has a generally rectangular shape having a length of 6.70 mm and a width of 2.76 mm. A center of the hole 810 may be arranged 11.71 mm from a first end of the first portion 815.

Figure 9:
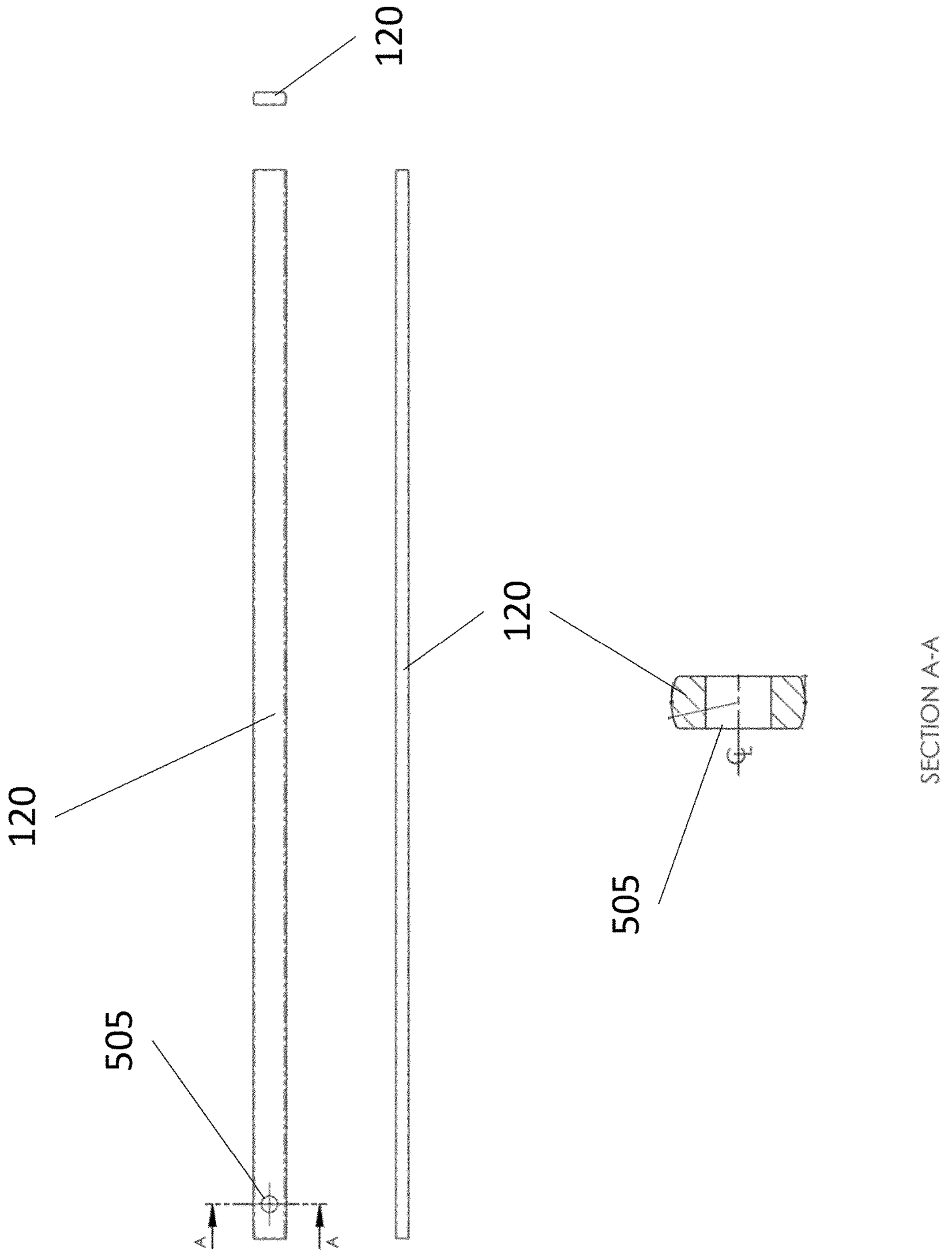
FIG. 9 shows various views of an exemplary and non-limiting clamp rod of the tremolo clamp in accordance with aspects of the disclosure.

FIG. 9 shows various views of an exemplary and non-limiting clamp rod 120 of the tremolo clamp in accordance with aspects of the disclosure. As shown in FIG. 9, with an exemplary and non-limiting embodiment, the clamp rod 120 has a generally rectangular cross-sectional shape and extends in a longitudinal direction. The clamp rod 120 includes hole 505 for attachment of the fixed clamp arm (not shown). With an exemplary and non-limiting embodiment, the clamp rod 120 has a length of 206.12 mm and width of 6.50 mm and thickness of 2.54 mm. The hole 505 may have a diameter of 3.20 mm. The generally rectangular cross-sectional shape may have rounded shorter sides having a radius of curvature of 3.25 mm.

In accordance with aspects of the disclosure, the clamp rod 120 (e.g., a metal bar) supports the clamp arms (e.g., either fixedly or in an adjustable manner) and provides smooth, sliding action of the positionable clamp arms as well as durability for the tremolo clamp is used to support the body of the guitar in an upside-down while performing spring changes and inserting the strings into the bridge from the backside of the guitar body.

Figure 10:
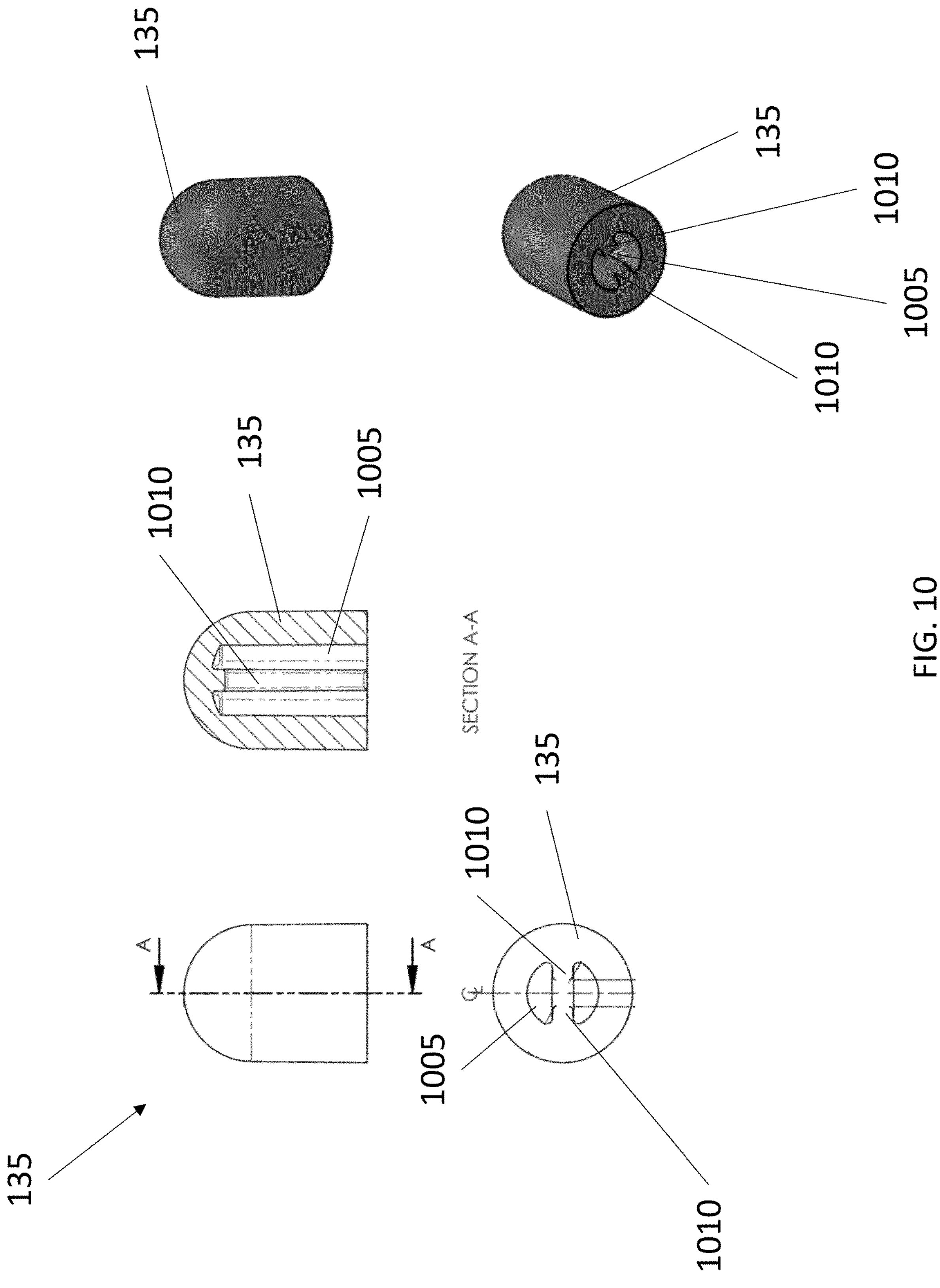
FIG. 10 shows various views of an exemplary and non-limiting end cap of the clamp rod of the exemplary and non-limiting tremolo clamp in accordance with aspects of the disclosure.

FIG. 10 shows various views of an exemplary and non-limiting end cap 135 of the clamp rod of the exemplary and non-limiting tremolo clamp in accordance with aspects of the disclosure. As shown in FIG. 10, the end cap 135 includes a recess 1005 for receiving an end of the clamp rod (not shown). With an exemplary and non-limiting embodiment, the recess 1005 includes opposing projections 1010 configured and arranged for frictional engagement with the clamp rod. With an exemplary and non-limiting embodiment, the end cap 135 has an outer diameter of 12.89 mm and a recess diameter of 6.62 mm. A width of a gap between the two opposing projections 1010 (into which the clamp rod is inserted) may be 2.53 mm With an exemplary and non-limiting embodiment, the end cap 135 may have a height of 17 mm.

Figure 11:
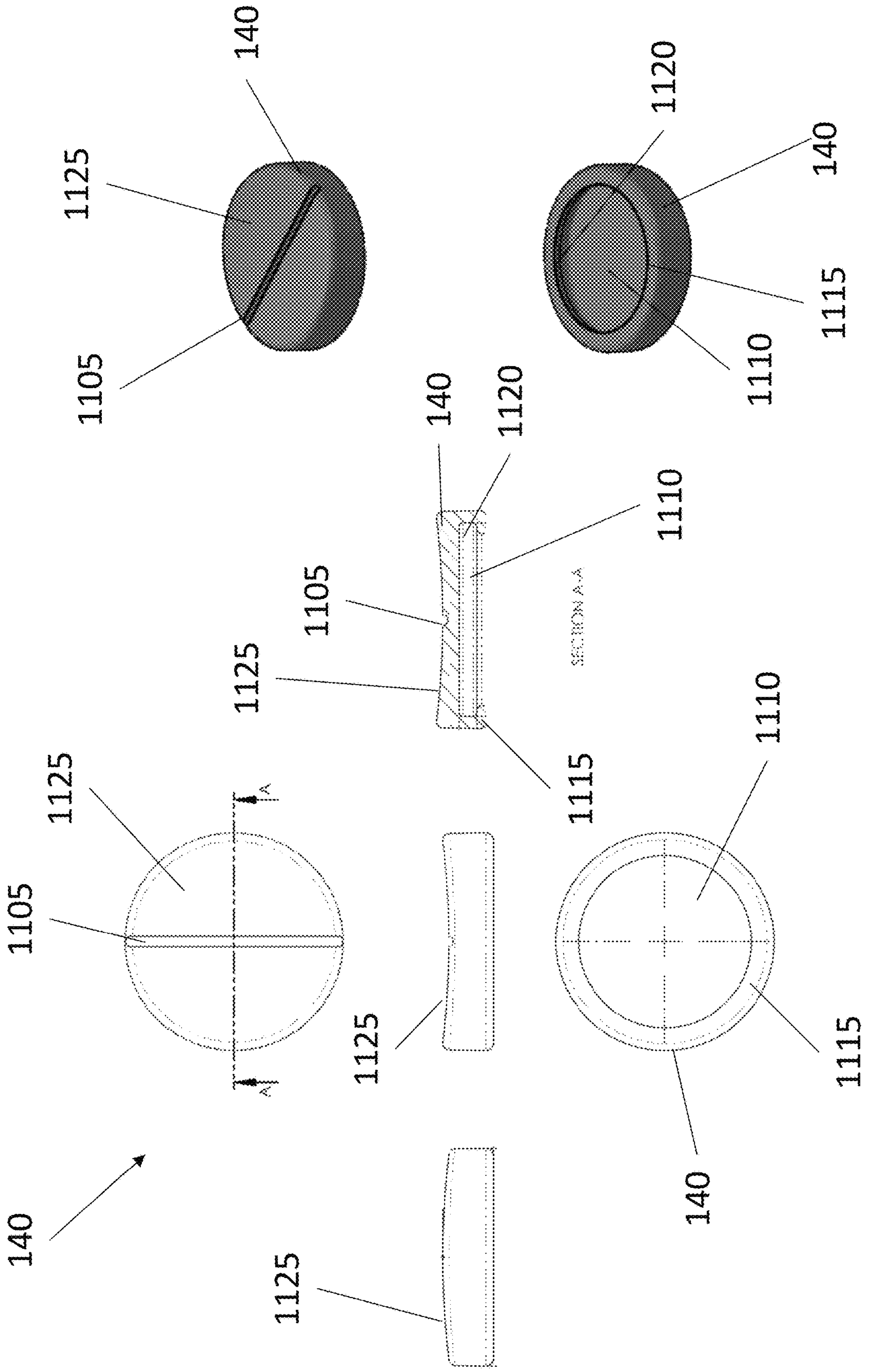
FIG. 11 shows various views of an exemplary and non-limiting contact pad of the exemplary and non-limiting tremolo clamp in accordance with aspects of the disclosure.

FIG. 11 shows various views of an exemplary and non-limiting contact pad 140 of the exemplary and non-limiting tremolo clamp in accordance with aspects of the disclosure. As shown in FIG. 11, the contact pad 140 includes a circular contact surface 1125 and a center groove 1105 in the contact surface 1125. The contact pad 140 includes a recess 1110 for accommodating the pad platform (not shown). A rim 1115 on the bottom of the contact pad 140 is structed and arranged to be elastically deformed and retain the contact pad 140 on the pad platform (not shown). As shown in the side views of FIG. 11, with the exemplary embodiment, the contact surface 1125 has a concave profile with a nadir at the center groove 1105 and peaks at the respective edges of the contact pad 140.

In accordance with aspects of the disclosure, the curved or concave profile is on the first positionable clamp arm 110, which may enable more secure contact between the contact surface 1125 and the guitar body. The center groove 1105 in the contact surface 1125 allows for deformation of the contact pad 140. In accordance with additional aspects of the disclosure, the curved or concave profile is also on the second positionable clamp arm 115, which may enable more secure contact with the tremolo arm (or whammy bar). For example, the curved (or concave) profile induces a centering of the tremolo arm on the contact pad 140 when contacting the tremolo arm with the contact pad 140. Additionally, the center groove 1105 assists in retaining the tremolo arm (or whammy bar) in the engaged position on the contact pad 140. In such a manner, the center groove 1105 and the contact surface 1125 serve as a support for the tremolo arm when the tremolo arm is depressed (e.g., fully depressed) by the second positionable clamp arm 115. In accordance with aspects of the disclosure, this ensures little movement of the tremolo arm (or whammy bar) during maintenance operations. In accordance with aspects of the disclosure, the contact pad 140 is operable to be rotated on the pad support of the positionable clamp arm. In such a manner, the contact surface 1125 and or the center groove 1105 can be rotated as necessary for optimum engagement with either the guitar body and/or the tremolo arm.

With an exemplary and non-limiting embodiment, the contact pad 140 may have an outside diameter of 31.75 mm. The recess 1110 may have a diameter of 28.24 mm and a depth of 2.54 mm. The inner diameter of the rim 1115 may be 25.15 mm and an overall depth of the recess 1115 (including the thickness of the rim 1115) may be 4.06 mm. The contact pad 140 may have a maximum thickness (at peaks at the respective edges of the contact pad 140) of 7.48 mm. As shown in FIG. 11, the recess 1110 of the contact pad 140 includes a rim retention region 1120 for accommodating the rim of the pad platform (not shown).

In accordance with aspects of the disclosure, in an exemplary embodiment, the contact pads 140 are made of medium density rubber. By using medium density rubber, there will be no rub off of rubber onto the guitar body after the tremolo clamp has been removed from the guitar body. The contact pads 140 may be replaceable with either new pads or pads with a different shape (e.g., flat contact pads or contact pads having a greater curve) and/or contact material (e.g., felt, cork, plastic).

Figure 12:
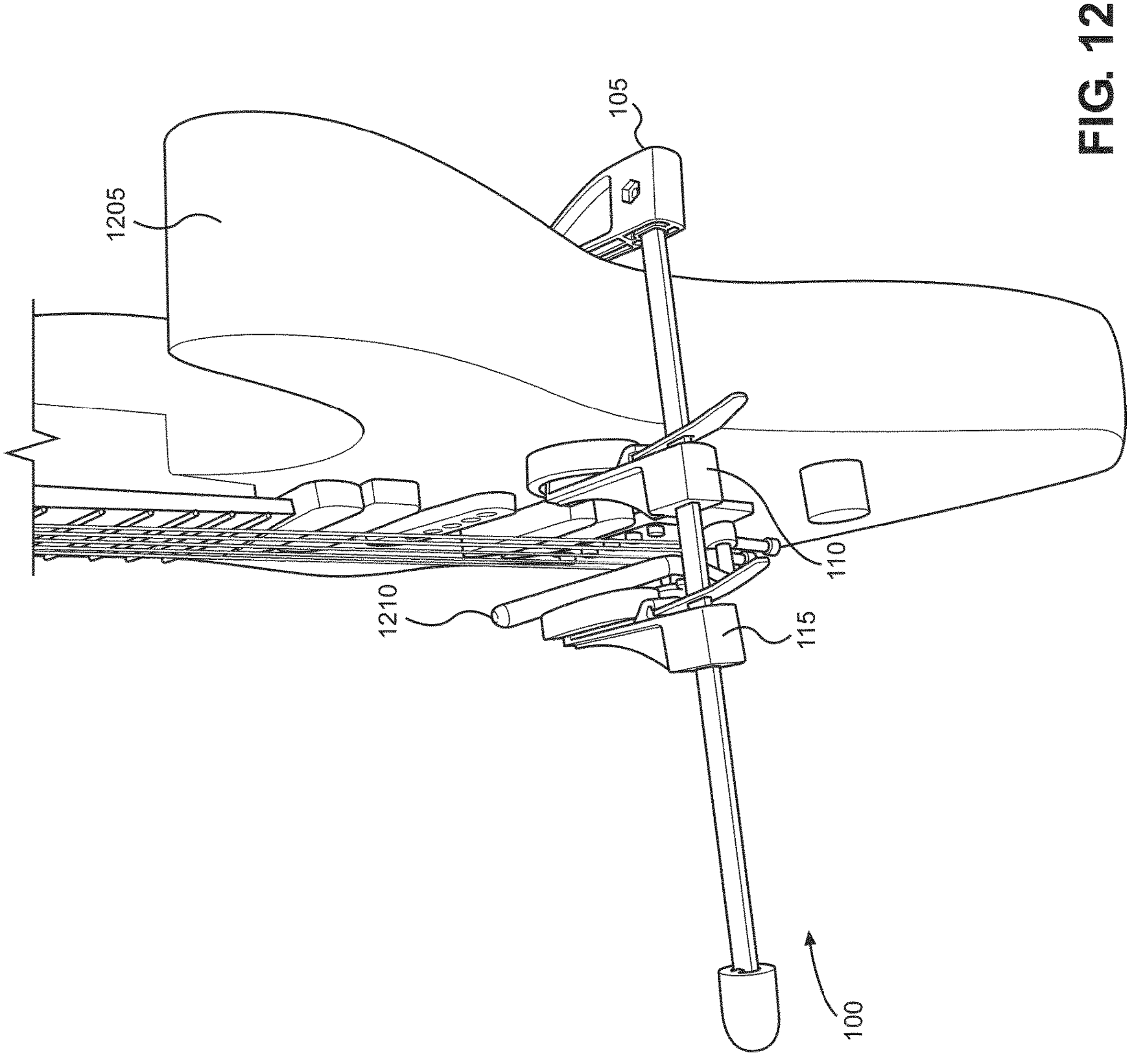
FIG. 12 shows a view of the exemplary and non-limiting tremolo clamp arranged on a tremolo-equipped guitar and retaining the tremolo arm in a depressed and string-tension reduced position in accordance with aspects of the disclosure.

FIG. 12 shows a view of the exemplary and non-limiting tremolo clamp 100 arranged on a tremolo-equipped guitar 1205 and retaining the tremolo arm 1210 in a depressed and string-tension reduced position in accordance with aspects of the disclosure. As shown in FIG. 12, the fixed clamp arm 105 and the first positionable clamp arm 110 are used to secure the tremolo clamp 100 to the tremolo-equipped guitar 1205, while the second positionable clamp arm 115 is engaged with the tremolo arm 1210 retaining the tremolo arm in a depressed and string-tension reduced position. In the position shown in FIG. 12, the tremolo clamp 100 is attached to a lower side of the tremolo-equipped guitar 1205.

Figure 13:
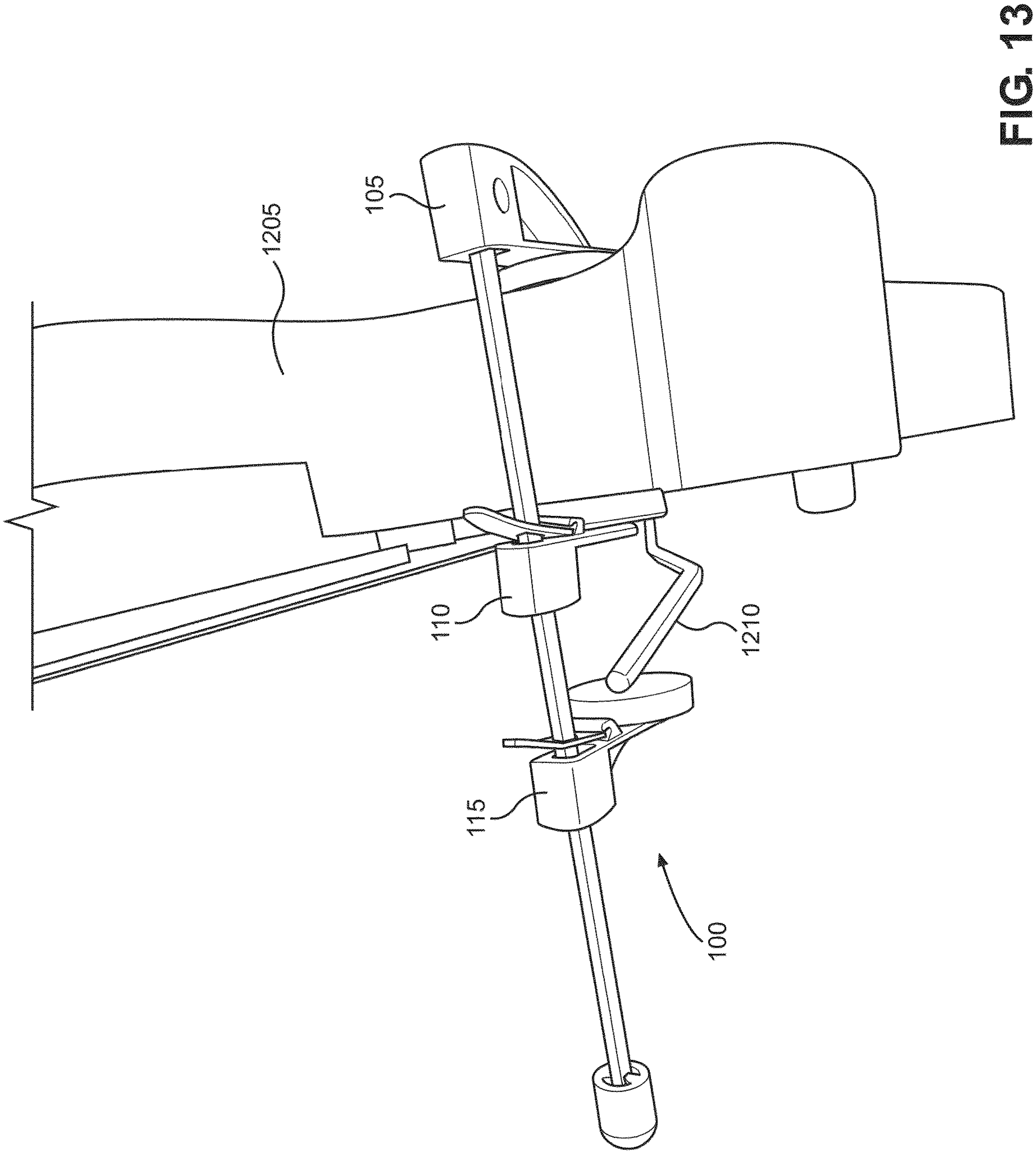
FIG. 13 shows a view of the exemplary and non-limiting tremolo clamp arranged in an alternative position on a tremolo-equipped guitar and retaining the tremolo arm in a depressed and string-tension reduced position in accordance with aspects of the disclosure.

FIG. 13 shows a view of the exemplary and non-limiting tremolo clamp arranged in an alternative position on a tremolo-equipped guitar 1205 and retaining the tremolo arm 1210 in a depressed and string-tension reduced position in accordance with aspects of the disclosure. As shown in FIG. 13, the fixed clamp arm 105 and the first positionable clamp arm 110 are used to secure the tremolo clamp 100 to the tremolo-equipped guitar 1205, while the second positionable clamp arm 115 is engaged with the tremolo arm 1210 retaining the tremolo arm in a depressed and string-tension reduced position. In the alternative position shown in FIG. 13, the tremolo clamp 100 is attached between the neck and a horn of the guitar body of the tremolo-equipped guitar 1205.

Figure 14:
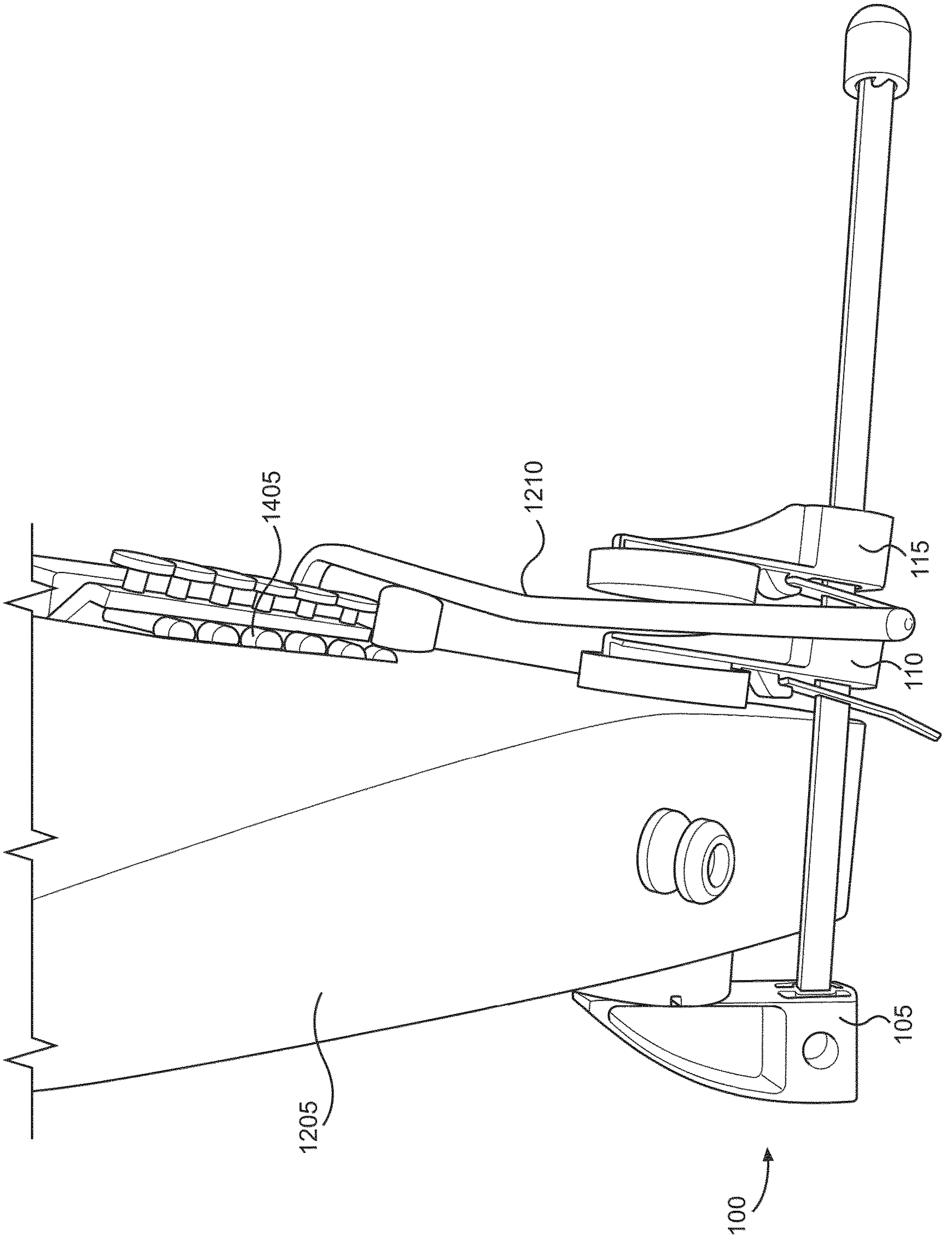
FIG. 14 shows a view of the exemplary and non-limiting tremolo clamp arranged in an alternative position behind the bridge on a tremolo-equipped guitar and retaining the tremolo arm in a depressed and string-tension increased position in accordance with aspects of the disclosure.

FIG. 14 shows a view of the exemplary and non-limiting tremolo clamp 100 arranged in an alternative position behind the bridge 1405 on a tremolo-equipped guitar 1205 and retaining the tremolo arm 1210 in a depressed and string-tension increased position in accordance with aspects of the disclosure. As shown in FIG. 14, the fixed clamp arm 105 and the first positionable clamp arm 110 are used to secure the tremolo clamp 100 to the tremolo-equipped guitar 1205, while the second positionable clamp arm 115 is engaged with the tremolo arm 1210 retaining the tremolo arm in a depressed and string-tension increased position. In the position shown in FIG. 14, the tremolo clamp 100 is attached to a side of the tremolo-equipped guitar 1205 behind the bridge 1405. In contrast to the arrangements in FIGS. 12 and 13 (in which the tremolo clamp is attached in front of the bridge, e.g., between the bridge and the nut), in the arrangement of FIG. 14, with the second positionable clamp arm 115 engaged with the tremolo arm 1210 from behind the bridge 1405, the bridge 1405 is pushed towards (or into) the guitar body, thus increasing the tension on the strings. In such a manner, for example, new strings may be stretched on the guitar.

Figure 15:
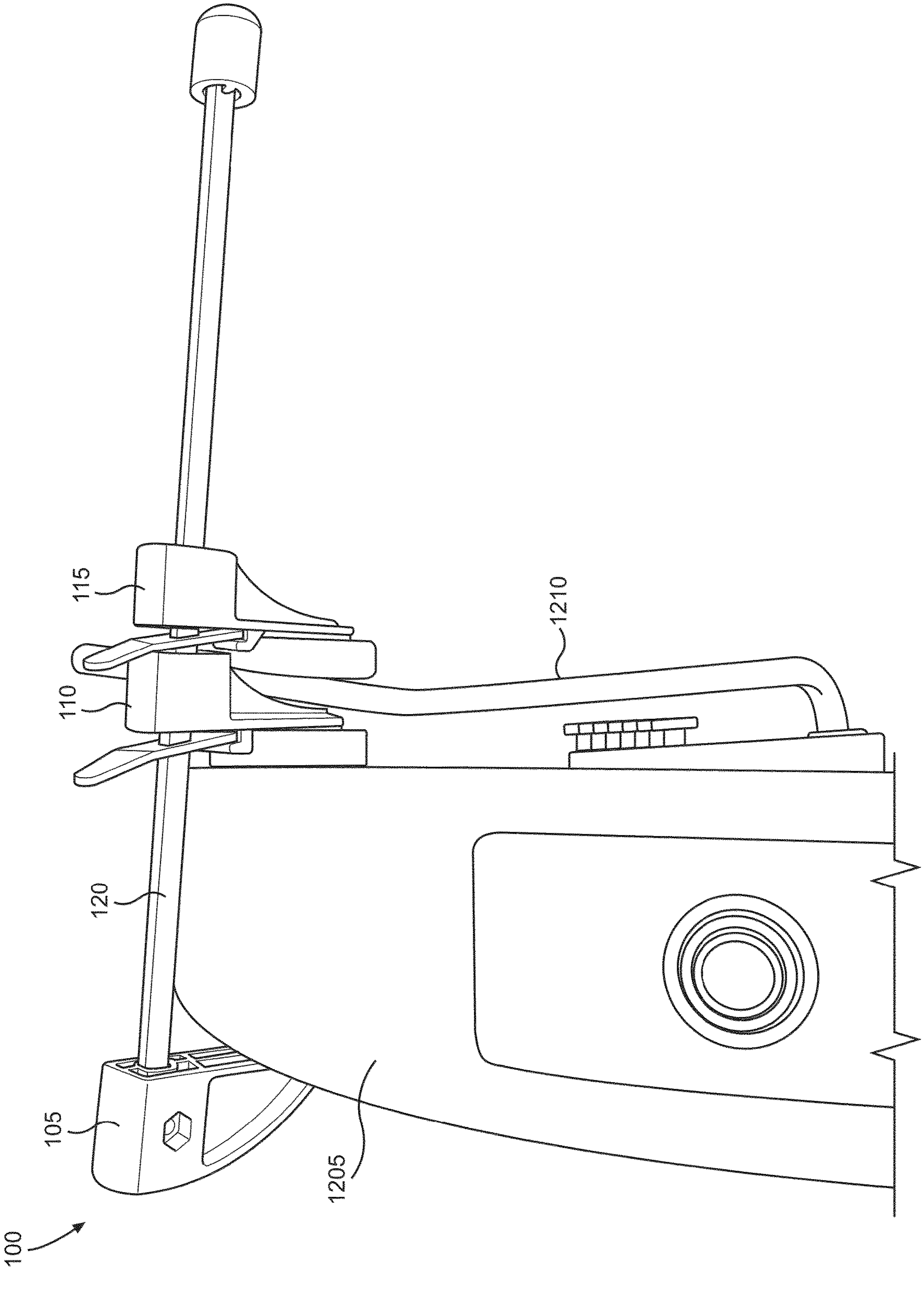
FIG. 15 shows an alternative view of the exemplary and non-limiting tremolo clamp arranged in the alternative position behind the bridge on a tremolo-equipped guitar and retaining the tremolo arm in the depressed and string-tension increased position in accordance with aspects of the disclosure.

FIG. 15 shows an alternative view of the exemplary and non-limiting tremolo clamp 100 arranged in the alternative position behind the bridge on a tremolo-equipped guitar 1205 and retaining the tremolo arm 1210 in the depressed and string-tension increased position in accordance with aspects of the disclosure. As shown in FIG. 15, the fixed clamp arm 105 and the first positionable clamp arm 110 are used to secure the tremolo clamp 100 to the tremolo-equipped guitar 1205, while the second positionable clamp arm 115 is engaged with the tremolo arm 1210 retaining the tremolo arm in a depressed and string-tension increased position. As further shown in FIG. 15, the second positionable clamp arm 115 may be arranged along the clamp rod 120 in contact with the first positionable clamp arm 110.

Figure 16:
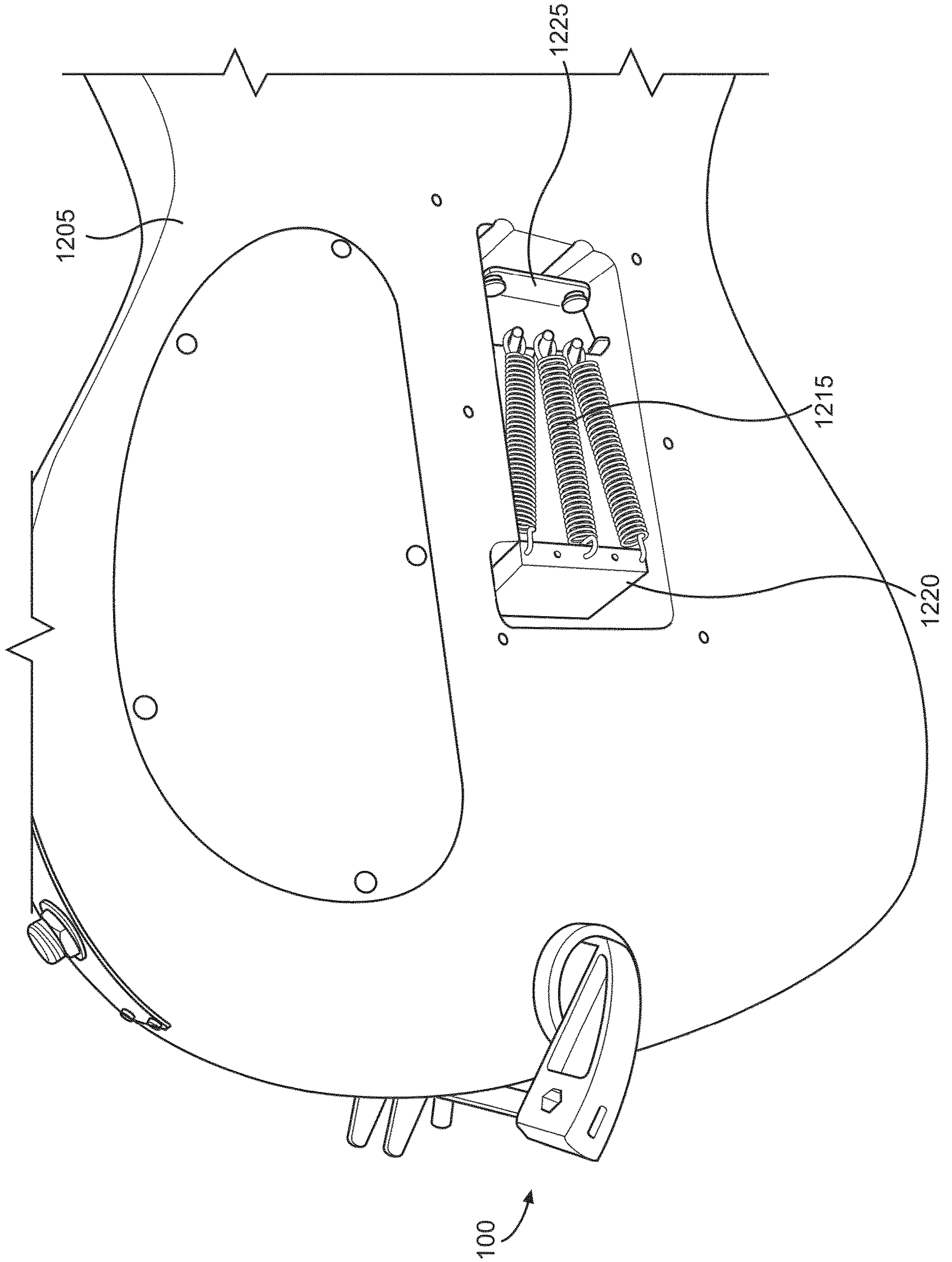
FIG. 16 shows a back view of a guitar with the tremolo clamp arranged in the alternative position behind the bridge and retaining the tremolo arm in the depressed and string-tension increased position in accordance with aspects of the disclosure.

FIG. 16 shows a back view of a guitar 1205 with the tremolo clamp 100 arranged in the alternative position behind the bridge (not shown) and retaining the tremolo arm (not shown) in the depressed and string-tension increased position and reducing the tension on the springs 1215 in accordance with aspects of the disclosure. As shown in FIG. 16, one end of the springs 1215 attach to the guitar body 1205 at an attachment plate 1225 and the other ends of the springs attach to block 1220 of the bridge. In the arrangement of FIG. 16, with the tremolo clamp 100 engaged with the tremolo arm 1210 from behind the bridge, the bridge is pushed towards (or into) the guitar body, thus swinging the block 1220 towards the attachment plate 1225, and thereby decreasing the tension on the springs 1215. In such a manner, for example, new springs or additional springs may be attached on the guitar.

Figure 17:
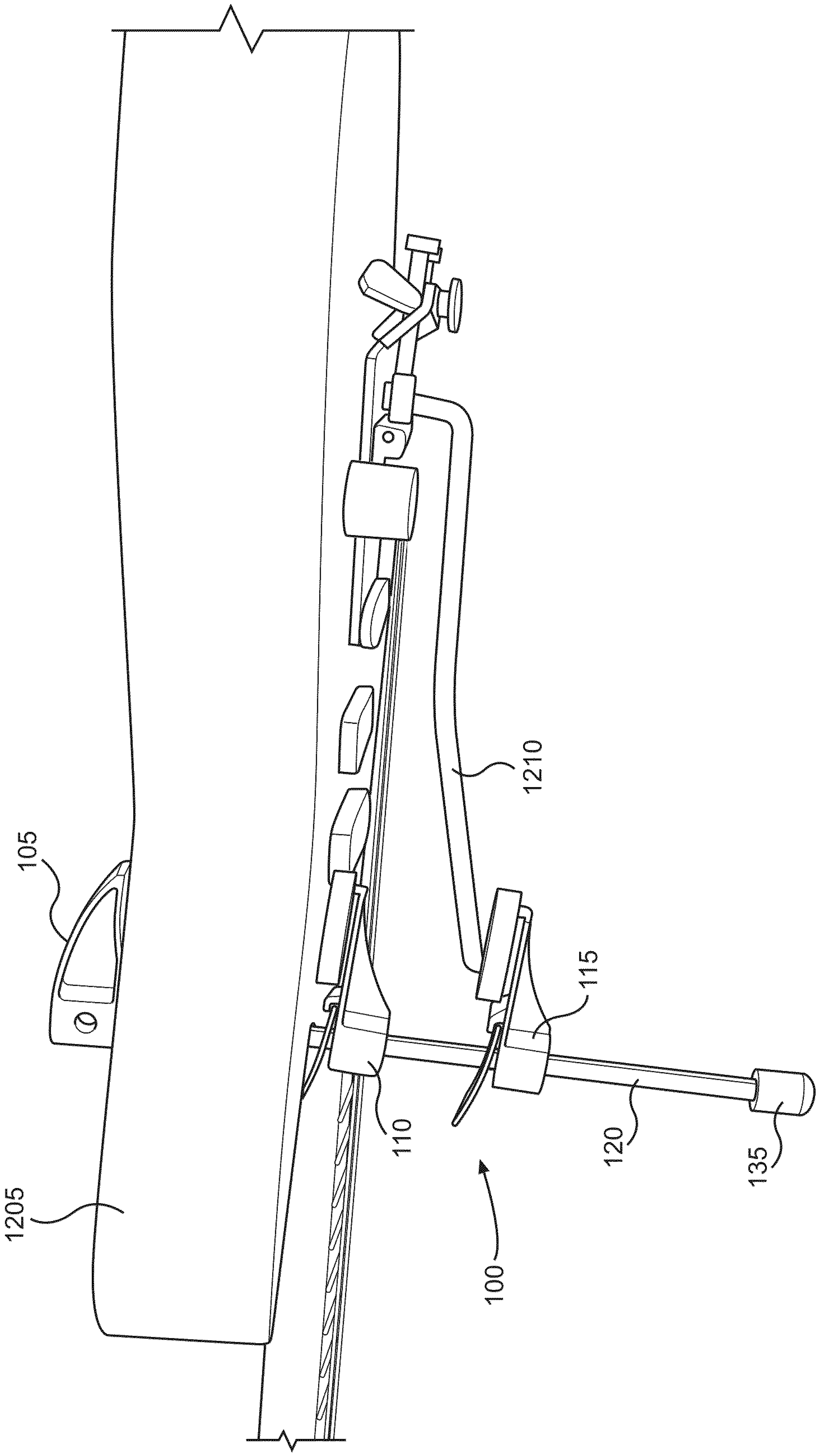
FIG. 17 shows a view of the exemplary and non-limiting tremolo clamp arranged in an alternative position on a tremolo-equipped guitar and retaining the tremolo arm in a depressed and string-tension reduced position and supporting the guitar in a support position in accordance with aspects of the disclosure.

FIG. 17 shows a view of the exemplary and non-limiting tremolo clamp 100 arranged in an alternative position on a tremolo-equipped guitar 1205 and retaining the tremolo arm 1210 in a depressed and string-tension reduced position while supporting the guitar 1205 in a support position in accordance with aspects of the disclosure. As shown in FIG. 17, the fixed clamp arm 105 and the first positionable clamp arm 110 are used to secure the tremolo clamp 100 to the tremolo-equipped guitar 1205, while the second positionable clamp arm 115 is engaged with the tremolo arm 1210 retaining the tremolo arm in a depressed and string-tension increased position. As shown in FIG. 17, while clamped to the guitar 1205, the clamp rod 120 (and end cap 135) are operable to support the guitar 1205 in the support position. In such a manner, the guitar 1205 may be stably supported and prevented from sliding in order to, for example, perform string changing via access to the back of the guitar 1205. As such, in accordance with aspects of the disclosure, the clamp rod 120 (e.g., a metal bar) offers smooth, sliding action of the clamp arms as well as durability for when the tremolo clamp 100 is used to support the body of the guitar when upside down while performing spring changes and/or when inserting the strings into the bridge from the backside of the guitar, like changing the strings on a Fender Stratocaster.

Figure 18:
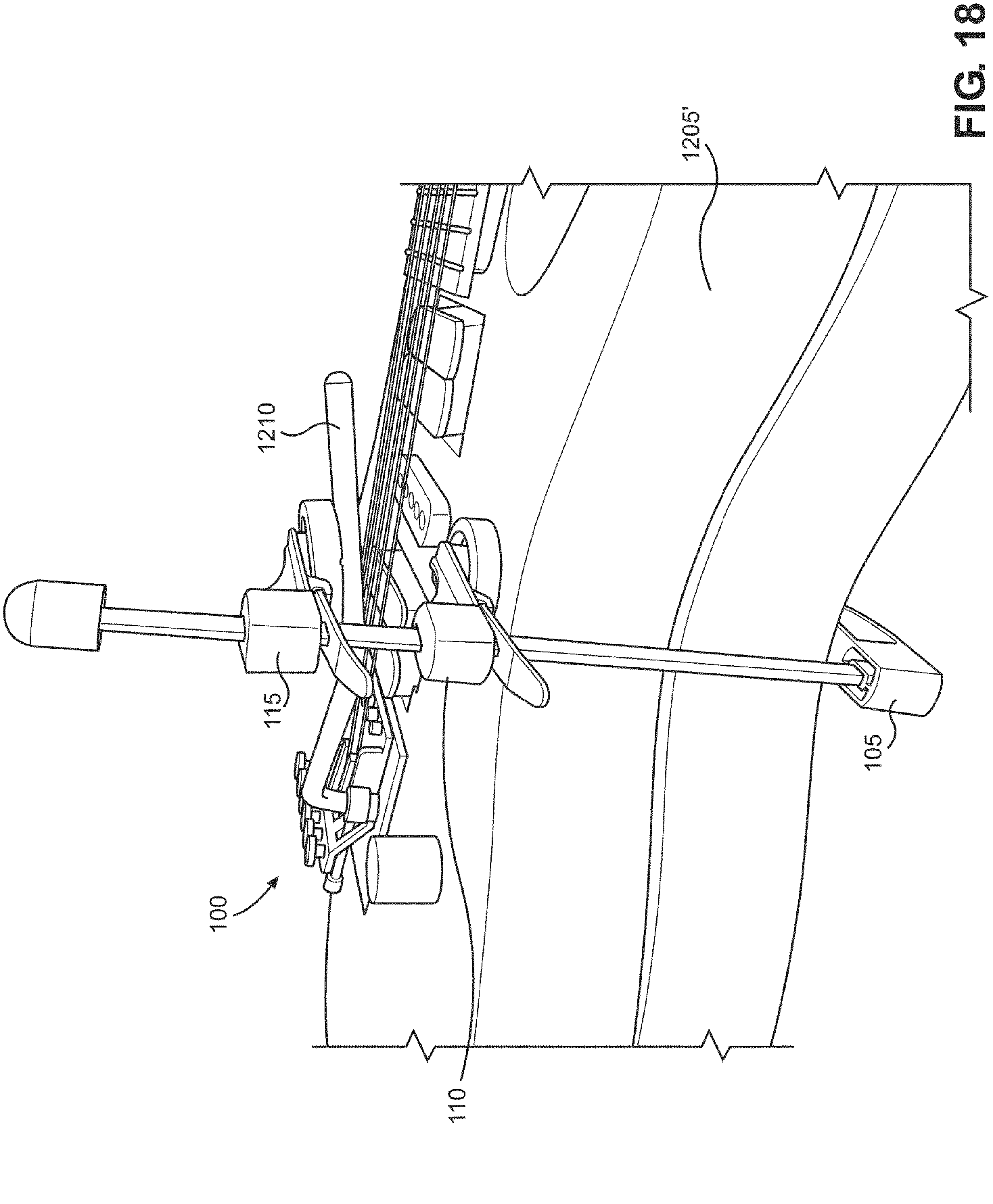
FIG. 18 shows a view of the exemplary and non-limiting tremolo clamp arranged on a larger tremolo-equipped guitar and retaining the tremolo arm in a depressed and string-tension reduced position in accordance with aspects of the disclosure.

FIG. 18 shows a view of the exemplary and non-limiting tremolo clamp 100 arranged on a larger (e.g., thicker) tremolo-equipped guitar 1205' and retaining the tremolo arm 1210 in a depressed and string-tension reduced position in accordance with aspects of the disclosure. As shown in FIG. 18, the fixed clamp arm 105 and the first positionable clamp arm 110 are used to secure the tremolo clamp 100 to the tremolo-equipped guitar 1205', while the second positionable clamp arm 115 is engaged with the tremolo arm 1210 retaining the tremolo arm in a depressed and string-tension increased position. As shown in FIG. 18, in accordance with aspects of the disclosure, the tremolo clamp 100 is operable and adjustable to accommodate guitars having different body thicknesses and profiles.

Figure 19:
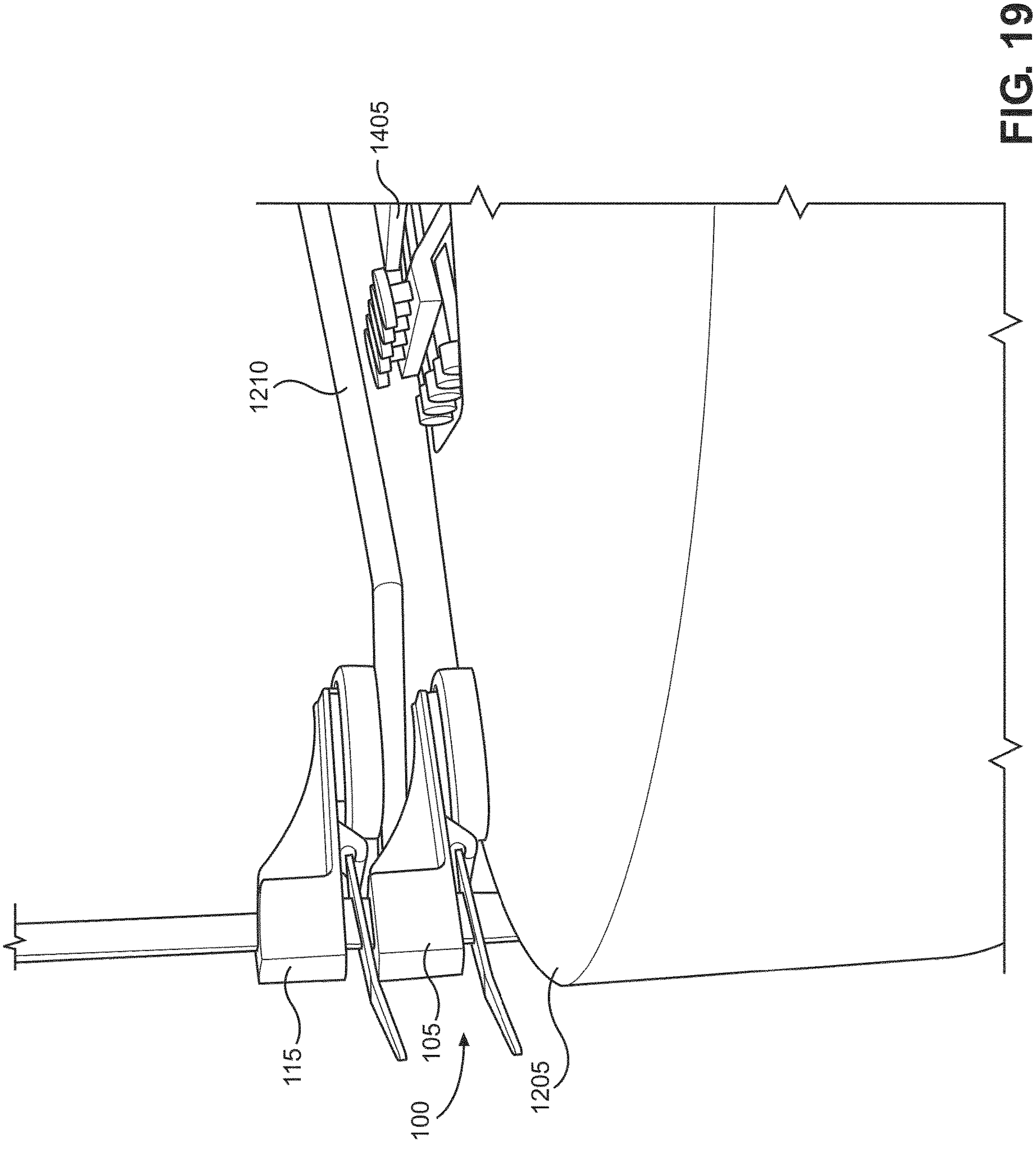
FIG. 19 shows an alternative view of the exemplary and non-limiting tremolo clamp arranged in the alternative position behind the bridge on a tremolo-equipped guitar and retaining the tremolo arm in the depressed and string-tension increased position in accordance with aspects of the disclosure.

FIG. 19 shows an alternative view of the exemplary and non-limiting tremolo clamp 100 arranged in the alternative position behind the bridge 1405 on a tremolo-equipped guitar 1205 and retaining the tremolo arm 1210 in the depressed and string-tension increased position in accordance with aspects of the disclosure. As shown in FIG. 19, the fixed clamp arm 105 and the first positionable clamp arm 110 are used to secure the tremolo clamp 100 to the tremolo-equipped guitar 1205, while the second positionable clamp arm 115 is engaged with the tremolo arm 1210 retaining the tremolo arm in a depressed and string-tension increased position. As further shown in FIG. 19, the second positionable clamp arm 115 may be arranged along the clamp rod 120 in contact with the first positionable clamp arm 110. Moreover, an upper profile of the first positionable clamp arm 110 may be configured to accommodate a lower portion of the second positionable clamp arm 115 so that the clamp arms can "nest" together to provide a minimum distance between the first positionable clamp arm 110 and the second positionable clamp arm 115.

Figure 20:
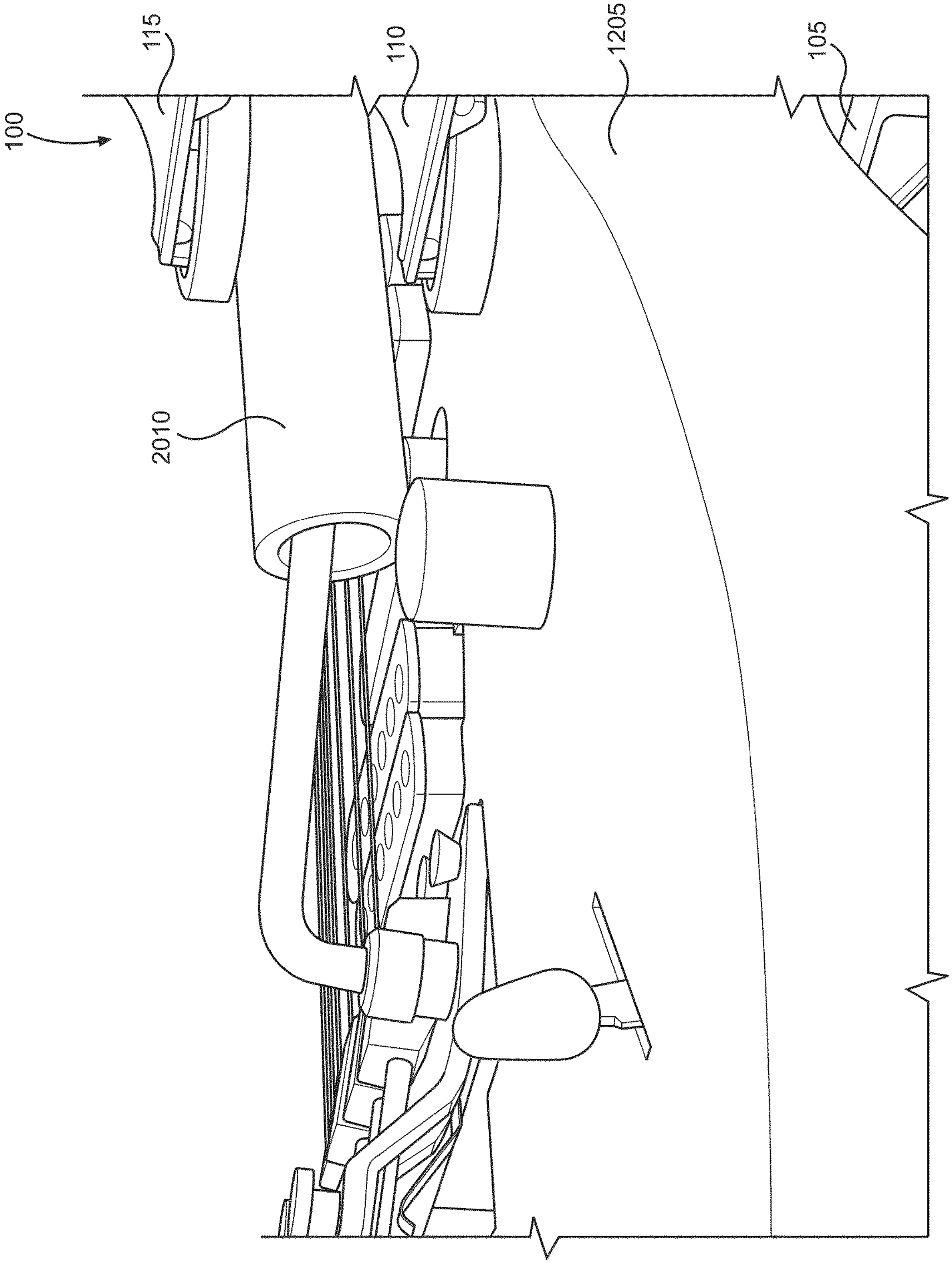
FIG. 20 shows a view of the exemplary and non-limiting tremolo clamp arranged on a tremolo-equipped guitar and retaining a (schematically-depicted) larger-sized tremolo arm in a depressed and string-tension reduced position in accordance with aspects of the disclosure.

FIG. 20 shows a view of the exemplary and non-limiting tremolo clamp 100 arranged on a tremolo-equipped guitar 1205 and retaining a (schematically-depicted) larger-sized tremolo arm 2010 in a depressed and string-tension reduced position in accordance with aspects of the disclosure. As shown in FIG. 20, the fixed clamp arm 105 and the first positionable clamp arm 110 are used to secure the tremolo clamp 100 to the tremolo-equipped guitar 1205, while the second positionable clamp arm 115 is engaged with the tremolo arm 2010 retaining the tremolo arm in a depressed and string-tension increased position. As shown in FIG. 20, in accordance with aspects of the disclosure, the tremolo clamp 100 is operable and adjustable to accommodate guitars having tremolo arms of different size and shape.

Figure 21:
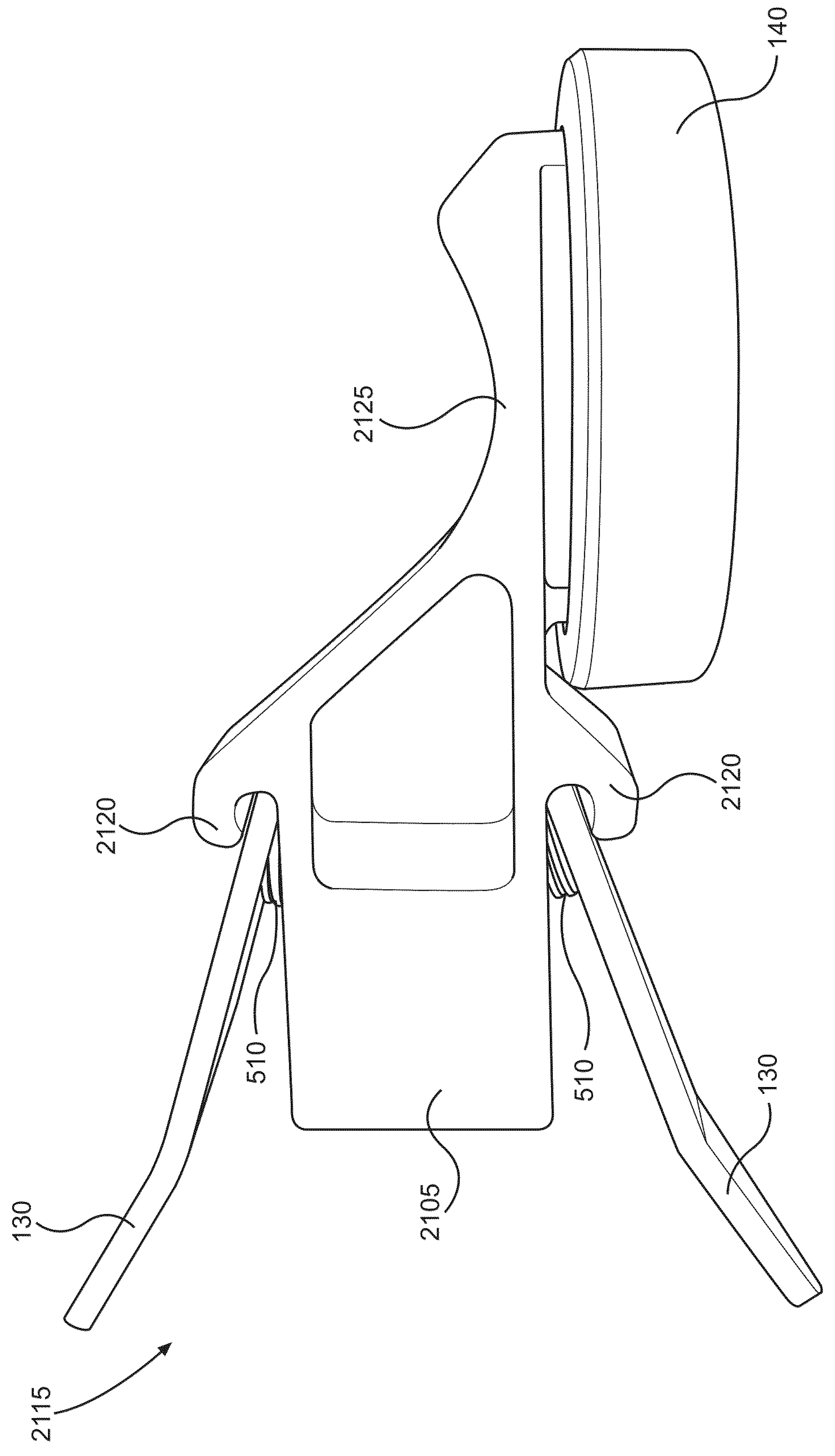
FIG. 21 shows a side view of an exemplary and non-limiting dual-direction-locking positionable clamp arm of a tremolo clamp in accordance with aspects of the disclosure.

FIG. 21 shows a side view of an exemplary and non-limiting dual-direction-locking positionable clamp arm 2115 in accordance with aspects of the disclosure. As shown in FIG. 21, dual-direction-locking positionable clamp arm 2115 includes a body 2105 and a pad platform having a circular shape in plan view. The pad platform includes a rim configured to retain a contact pad 140 thereon. The body 2105 includes a rod passage for accommodating the clamp rod (not shown). As shown in FIG. 21, the body 2105 includes lever retainers 2120 configured to retain respective locking levers 130 and a spring accommodation space configured to accommodate respective springs 510. The spring accommodation space is arranged adjacent the respective lever retainer 2120. In operation, the spring 510 arranged spring accommodation space biases the locking lever 130 into a locking position (relative to the clamp rod, not shown). By depressing a respective locking lever, the locking engagement of the respective locking lever 130 with the clamp rod (not shown) is temporarily suspended, thus allowing the respective positionable clamp arm to be slid along the clamp rod in one of the opening and closing directions. In accordance with aspects of the disclosure, with this exemplary embodiment, the dual-direction-locking positionable clamp arm 2115 is operable to lock in both the opening direction and the closing direction, and is not freely positionable in either direction. As also shown in FIG. 21, the body 1205 includes a tremolo arm support (or rest) 2125 for supporting an underside of a tremolo arm (not shown) when, for example, using the tremolo clamp to raise the tremolo arm in accordance with aspects of the disclosure. For example, when the tremolo arm/bar is fully elevated or lifted by the dual-direction-locking positionable clamp arm 2115, the curve of the support (or rest) 2125 in the body 1205 acts as a rest for the tremolo arm/bar 1210.

The dual-direction-locking positionable clamp arm 2115 may be a replacement part where the user can remove the second positionable clamp arm 115 that was originally fitted to the tremolo clamp 100 and replace it with the dual-direction-locking positionable clamp arm 2115 having a two-lever system. As explained above, the two-lever system allows pressure from both: top down force and down up force. In accordance with aspects of the disclosure, the dual-direction-locking positionable clamp arm 2115 allows the user to utilize the tremolo clamp 100 in other fashions of guitar maintenance or other maintenance requirements not associated with guitar or musical instruments.

Figure 22:
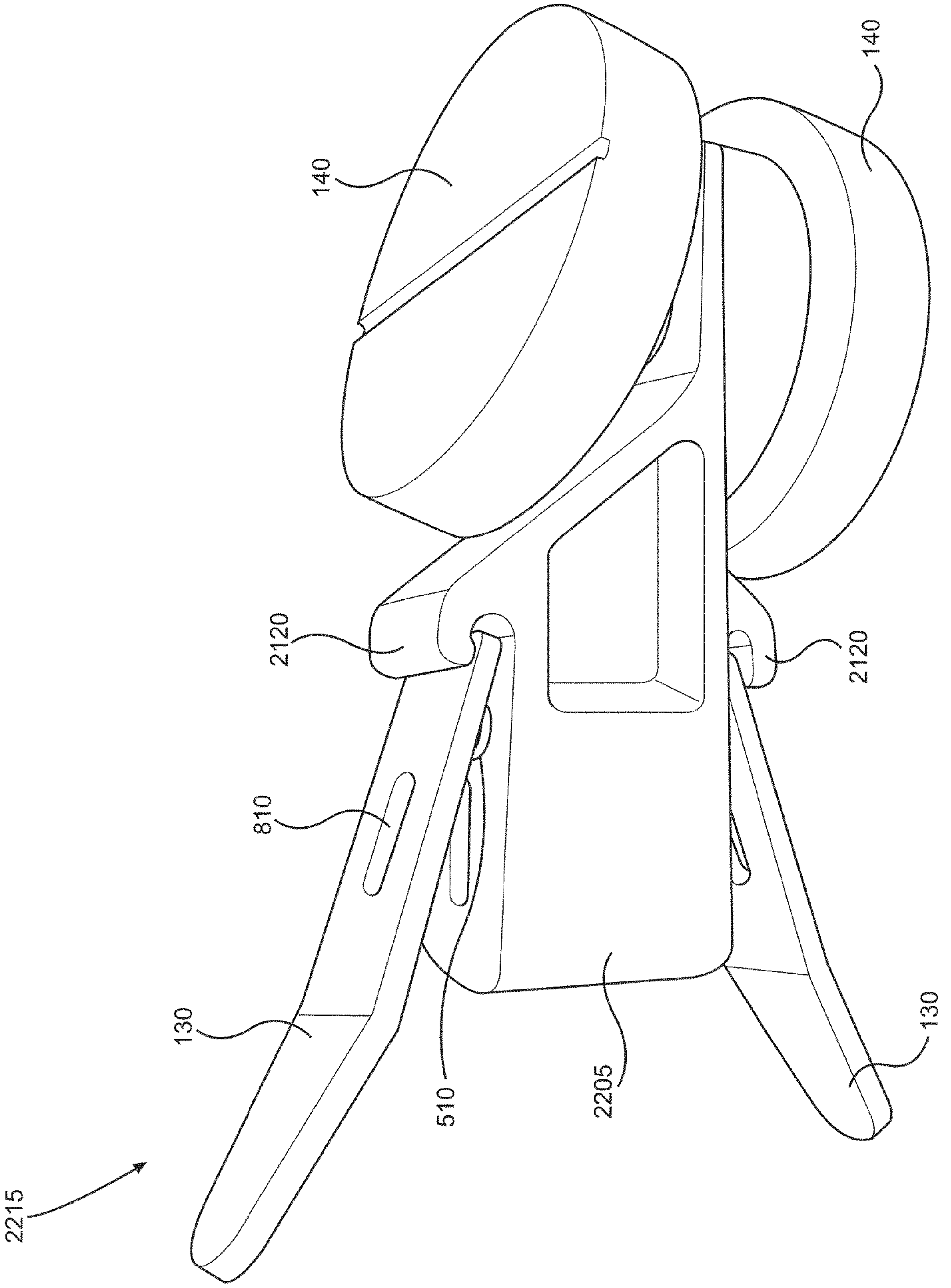
FIG. 22 shows perspective view of an exemplary and non-limiting dual-direction-locking positionable clamp arm of a tremolo clamp in accordance with aspects of the disclosure.

FIG. 22 shows perspective view of an exemplary and non-limiting dual-direction-locking positionable clamp arm of a tremolo clamp in accordance with aspects of the disclosure. As shown in FIG. 22, dual-direction-locking positionable clamp arm 2215 includes a body 2205 and two pad platforms each having a circular shape in plan view. The pad platforms each includes a rim configured to retain a respective contact pad 140 thereon. The body 2205 includes a rod passage for accommodating the clamp rod (not shown). As shown in FIG. 22, the body 2205 includes lever retainers 2120 configured to retain respective locking levers 130 and a spring accommodation spaces configured to accommodate respective springs 510. The spring accommodation space is arranged adjacent the lever retainer 2120. In operation, the spring 510 arranged spring accommodation space biases the locking lever 130 into a locking position (relative to the clamp rod, not shown). By depressing a respective locking lever 120, the locking engagement of the respective locking lever 130 with the clamp rod (not shown) via the hole 810 is temporarily suspended, thus allowing the positionable clamp arm to be slid along the clamp rod in one of the opening and closing directions. In accordance with aspects of the disclosure, with this exemplary embodiment, the dual-direction-locking positionable clamp arm 2215 is operable to lock in both the opening direction and the closing direction, and is not freely positionable in either direction. As also shown in FIG. 21, dual-direction-locking positionable clamp arm 2215 includes an upper support pad 140 for supporting an underside of a tremolo arm (not shown) when, for example, using the tremolo clamp to raise the tremolo arm in accordance with aspects of the disclosure.

Figure 23:
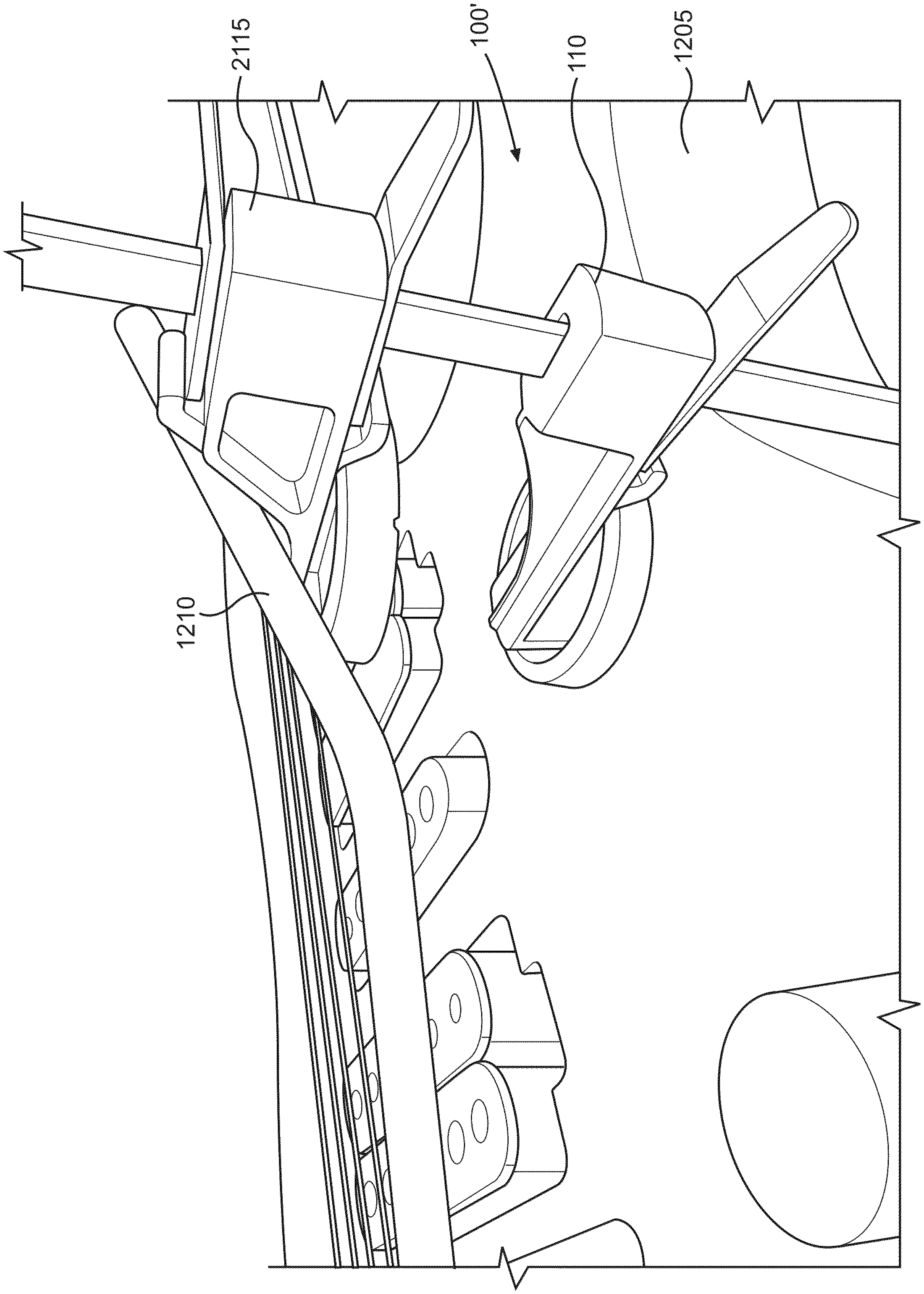
FIG. 23 shows a view of another exemplary and non-limiting tremolo clamp arranged on a tremolo-equipped guitar and retaining the tremolo arm in a raised and string-tension increased position in accordance with aspects of the disclosure.

FIG. 23 shows a view of another exemplary and non-limiting tremolo clamp arranged on a tremolo-equipped guitar and retaining the tremolo arm in a raised and string-tension increased position in accordance with aspects of the disclosure. As shown in FIG. 23, the fixed clamp arm (not shown) and the first positionable clamp arm 110 are used to secure the tremolo clamp 100' to the tremolo-equipped guitar 1205, while the dual-direction-locking positionable clamp arm 2115 is engaged with the tremolo arm 1210 retaining the tremolo arm in a raised and string-tension increased position. As shown in FIG. 23, an underside of a tremolo arm 1210 is arranged in the tremolo arm support 2125 and holding the tremolo arm in a raised position in accordance with aspects of the disclosure. As this embodiment utilizes a dual-direction-locking positionable clamp arm 2115, the clamp arm 2115 does not move when the downward force of the tremolo arm 1210 is applied to the tremolo arm support (or rest) 2125, in accordance with aspects of the disclosure.

In accordance with aspects of the disclosure, the tremolo clamp 100 is operable to tackle at least the "BIG FIVE" maintenance issues/problems that arise when working on a guitar that has a floating tremolo, namely: (1) string changes; (2) height adjustments of the tremolo; (3) intonation adjustments; (4) truss rod adjustments; and (5) spring changes.

For string changes, the user will quickly and easily attach the tremolo clamp to the guitar, the user will have clutter-free access to the tremolo, they will have stabilized the tremolo giving the user untethered ability to perform multiple maintenance tasks, let alone string changes. The user will then be able to perform string changes without fear of the tremolo bridge falling through the tremolo cavity and because of how the tremolo clamp locks the tremolo system into place, the user can easily change their strings. Because of how the tremolo clamp locks the tremolo into place, the new strings will have started their pre-stretch and this happens during installation, not after. No other Luthier tool in existence can make this claim. One of the biggest benefits of this pre-stretch being done during installation, is once the user removes the tremolo clamp and tunes their new strings to their desired tuning, the guitar will have greater tuning stability because the pre-stretch has already been done, and this offers the user instant playability. Without the tremolo clamp (and the installation pre-stretch), this stretching can normally take up to 3 days to get the level of playability that the tremolo clamp achieves within minutes. This saves valuable time especially if the user is a touring/gigging musician.

In operation, a user attaches the tremolo clamp to the guitar using the fixed arm and the first positionable clamp arm of the tremolo clamp to lock the tremolo clamp into position. Then the user may depress the tremolo arm and lock it into place with the second positionable clamp arm so that the tension of the strings is relieved. The user can then safely remove all of the strings without concern of the tremolo shifting and or changing position during maintenance. The user will then install the new strings and tune their guitar to their desired tuning. Once the first tuning has been achieved, the user may remove the tremolo clamp, which takes less than three seconds, and the user may re-tune their strings to their desired tuning. The pre-stretch has now been achieved and the guitar is player-ready.

When adjusting the tremolo height, all the strings need to be relieved of the tension they are holding. Traditionally to do this a user needs to detune all of the strings, adjust the tremolo height, retune the strings and check to see if the tremolo is at the correct height. If it is, then the job is done. If, however, the tremolo is not at the correct height, the process needs to be repeated until the tremolo is at the correct height. This process can take anywhere from fifteen to thirty minutes or more depending on the skill of the technician. The other way this adjustment to the height of the tremolo can be done is by depressing the tremolo arm down with one hand and navigating the height adjustments with the other hand. This process can be quicker, but it requires coordination most people struggle with or do not posses.

In accordance with aspects of the disclosure, the tremolo clamp makes short work of this task simply by attaching the tremolo clamp to the guitar using the fixed arm and the first positionable clamp arm of the tremolo clamp to lock the tremolo clamp into position. Then the user may depress the tremolo arm and lock it into place with the second positionable clamp arm so that the adjustment to the height can be made. To check if the height of the tremolo/bridge is correct, it is as simple as releasing the tremolo arm from the second positionable clamp arm and then checking the height adjustment that has just been made. If the height needs further adjustment, the user simply depresses the tremolo arm down with the second positionable clamp arm while the tremolo clamp is attached to the guitar. Once the height adjustment has been completed, it takes less than three seconds to remove the tremolo clamp from the guitar.

Intonation and truss rod adjustments are performed in a very similar way as height adjustments. The tension of the strings needs to be relieved, the adjustment needs to be made, then the strings need to be returned to the user's desired tuning. As explained above, when adjusting the height, it is possible for the user to manipulate and depress the tremolo arm with one hand. With intonation and truss rod adjustments, however, this is not an option. All of the strings need to be detuned for the adjustments to be made. Using the standard, typical approach when making these adjustments, it can take the user a significant amount of time to perform these adjustments. Truss rod and intonation adjustments are not easy for the average person to perform and in most cases, the average person will utilize the help of a guitar technician to perform these tasks, as well as every other task when it comes to the maintenance of a guitar with a floating tremolo.

In accordance with aspects of the disclosure, the tremolo clamp makes short work of this task by attaching the tremolo clamp to the guitar using the fixed arm and the first positionable clamp arm of the tremolo clamp to lock the tremolo clamp into position. Then the user may depress the tremolo arm and lock it into place with the second positionable clamp arm so that the truss rod and Intonation adjustments can be made. To check to see if the truss rod has put the neck into the correct position, it is as simple as releasing the tremolo arm from the second positionable clamp arm and checking the adjustment that has just been made. If it needs further adjustment, the user will simply depress the tremolo arm down with the second positionable clamp arm while the tremolo clamp is still attached to the guitar. The process is exactly the same when adjusting and checking the intonation. Once the truss rod or intonation adjustment has been completed, it takes less than three seconds to remove the tremolo clamp from the guitar.

Spring changes on the guitar happen with less frequency, but it comes with its own challenges. The user will rotate the tremolo arm towards the back of the guitar body, turn the guitar upside down and then use their leg to depress the tremolo arm, while at the same time hoping and praying that the tremolo arm doesn't shift during the maintenance being performed. If a shift does happen it will require the user to reset the tremolo into its ideal position and finish the process. Once again because of the challenge associated with performing this maintenance, most users employ the help of a local technician.

With the tremolo clamp, however, the user simply attaches the tremolo clamp to the guitar using the fixed arm and the first positionable clamp arm of the tremolo clamp to lock the tremolo clamp into position. Then the user may raise the tremolo arm and lock it into place with the second positionable clamp arm so that the truss rod and Intonation adjustments can be made. In embodiments, as used may utilize a dual-direction locking positionable clamp arm to lock the tremolo arm in a raised position. In some embodiments, the top of the dual-direction locking positionable clamp arm has in its design, a curve forming a support (or rest) that allows the tremolo arm to rest on it for greater support and stability. With another contemplated embodiment, a single-direction locking positionable clamp arm may be removed from the clamp rod and its orientation reversed, so that the single-direction locking positionable clamp is operable lock the tremolo arm in a raised position. With the tremolo arm in a raised position, the tension on the springs are reduced. Once the maintenance of the springs has been completed, it takes less than three seconds to remove the tremolo clamp from the guitar.

While the present disclosure and associated inventive concepts have been illustrated by the description of various embodiments thereof, and while these embodiments have been described in considerable detail, it is not the intention of the Applicant to restrict or in any way limit the scope of any appended claims to such detail. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the general inventive concepts.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the disclosure has been described with reference to particular examples, materials and embodiments, the invention is not intended to be limited to the particulars disclosed; rather the invention extends to all functionally equivalent structures, methods, and uses such as are within the scope of the appended claims. For example, while explained in the context of a tremolo equipped guitar, it should be understood that the tremolo clamp may be utilized on any tremolo-equipped instrument, such as a mandolin.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A tremolo clamp for attaching to a tremolo-equipped musical instrument having a tremolo arm and retaining the tremolo arm in a selected position, the tremolo clamp comprising:

a clamp rod extending in a longitudinal direction;

a fixed clamp arm fixedly attached to a first end of the clamp rod;

a first positionable clamp arm slidingly attached along the clamp rod; and a second positionable clamp arm slidingly attached along the clamp rod;

wherein the first positionable clamp arm is arranged between the fixed clamp arm and the second positionable clamp arm.

2. The tremolo clamp of claim 1, wherein the fixed clamp arm and the first positionable clamp arm are operable to attach the tremolo clamp to the tremolo-equipped guitar and the second positionable clamp arm is operable to retain the tremolo arm in the selected position.

3. The tremolo clamp of claim 1, wherein each of the first positionable clamp and the second positionable clamp includes a frictional locking mechanism operable to releasably lock the first positionable clamp or the second positionable clamp in relative position along longitudinal direction on the clamp rod.

4. The tremolo clamp of claim 3, wherein the frictional locking mechanism includes a spring and lock lever, the lock lever having a hole therethrough configured to receive the clamp rod.

5. The tremolo clamp of claim 3, wherein the frictional locking mechanism is a one-way locking mechanism that permits movement in a first direction along the longitudinal direction while preventing movement in a second direction opposite the first direction.

6. The tremolo clamp of claim 3, wherein the frictional locking mechanism for the first positionable clamp is a one-way locking mechanism that permits movement in a first direction along the longitudinal direction while preventing movement in a second direction opposite the first direction and the frictional locking mechanism for the second positionable clamp is a two-way locking mechanism that prevents movement in either direction along the longitudinal direction.

7. The tremolo clamp of claim 1, wherein each of the clamp arms includes a removable contact pad configured for engagement with a body of the musical instrument and/or the tremolo arm.

8. The tremolo clamp of claim 7, wherein the contact pad has a concave contact surface and a groove traversing the concave contact surface.

9. The tremolo clamp of claim 7, wherein a fixed clamp arm contact pad faces a first direction and a first positionable clamp arm contact pad and the second positionable clamp arm contact pad face a second direction opposite to the first direction.

10. The tremolo clamp of claim 7, wherein each of the clamp arms includes a pad platform upon which the contact pad is removably attached, and wherein the contact pad is selectively rotatable on the pad platform.

11. The tremolo clamp of claim 7, wherein the second positionable clamp arm includes an additional contact pad on a side of the clamp arm opposite the contact pad.

12. The tremolo clamp of claim 7, wherein the second positionable clamp arm includes a tremolo arm support on a side of the clamp arm opposite the contact pad.

13. The tremolo clamp of claim 1, further comprising an end cap frictionally engaged with a second end of the clamp rod.

14. The tremolo clamp of claim 1, wherein each of the clamp arms includes a rod passage for accommodating the clamp rod.

15. A method using a tremolo clamp to retain a tremolo arm of a tremolo-equipped musical instrument in a selected position, the tremolo clamp having a clamp rod extending in a longitudinal direction; a fixed clamp arm fixedly attached to a first end of the clamp rod; a first positionable clamp arm slidingly attached along the clamp rod; and a second positionable clamp arm slidingly attached along the clamp rod, the method comprising:

attaching the tremolo clamp to a selected region of the tremolo-equipped musical instrument by sliding the first positionable clamp arm along the clamp rod and clamping the musical instrument between the fixed clamp arm and the first positionable clamp arm;

placing the tremolo arm in the selected position; and sliding the second positionable clamp along the clamp rod into contact with the tremolo arm to retain the tremolo arm in the selected position.

16. The method of claim 15, wherein the selected position of the tremolo arm releases tension on strings of the musical instrument.

17. The method of claim 15, wherein the selected position of the tremolo arm releases tension on springs of the tremolo-equipped musical instrument.

18. The method of claim 15, wherein the selected region is behind or in front of a bridge of the musical instrument.

19. The method of claim 15, wherein the selected position is a raised position relative to the musical instrument.

20. The method of claim 15, wherein the selected position is a lowered position relative to the musical instrument.

* * * * *